United States Patent [19]
Nakazawa et al.

[11] Patent Number: 5,319,719
[45] Date of Patent: Jun. 7, 1994

[54] PROCESSING APPARATUS FOR RADIOGRAPHIC IMAGE SIGNALS

[75] Inventors: Masayuki Nakazawa; Hisanori Tsuchino, both of Tokyo, Japan

[73] Assignee: Konica Corporation, Tokyo, Japan

[21] Appl. No.: 881,421

[22] Filed: May 11, 1992

[30] Foreign Application Priority Data

May 15, 1991 [JP] Japan ................................. 3-110298
Jan. 24, 1992 [JP] Japan ................................. 4-011126

[51] Int. Cl.$^5$ .................... G06K 9/00; G06F 15/00; G03C 5/16
[52] U.S. Cl. ........................... 382/6; 382/54; 364/413.13; 250/580
[58] Field of Search .............. 382/6, 54, 56; 364/413.13, 413.16; 250/327.2; G06K 9/00, 9/40; G06F 15/00; G03C 5/16

[56] References Cited

U.S. PATENT DOCUMENTS

| | | | |
|---|---|---|---|
| 3,859,527 | 1/1975 | Luckey | 250/327 |
| 4,315,318 | 2/1982 | Kato et al. | 364/515 |
| 4,317,179 | 2/1982 | Kato et al. | 382/6 |
| 4,387,428 | 6/1983 | Ishida et al. | 364/413.13 |
| 4,571,635 | 2/1986 | Mahmoodi et al. | 358/75 |
| 4,794,531 | 12/1988 | Morishita et al. | 382/6 |
| 4,903,205 | 2/1990 | Hishinuma | 364/413.13 |
| 5,087,972 | 2/1992 | Sumi | 358/166 |

FOREIGN PATENT DOCUMENTS

| | | |
|---|---|---|
| 0153167 | 8/1985 | European Pat. Off. . |
| 2962426 | 9/1980 | Fed. Rep. of Germany . |
| 4012364 | 11/1990 | Fed. Rep. of Germany . |
| 2445536 | 7/1980 | France . |
| 2165717 | 4/1986 | United Kingdom . |

*Primary Examiner*—Yon J. Couso
*Attorney, Agent, or Firm*—Frishauf, Holtz, Goodman & Woodward

[57] ABSTRACT

An apparatus for processing radiographic image signals, including a photographing device for detecting an amount of radioactive rays transmitted through a subject and for converting the rays into original digital image signals in the form of pixels, and a signal processing circuit for processing the original digital image signals so as to decrease the amplitude of a low frequency component of the original digital image signals.

24 Claims, 14 Drawing Sheets

PROCESSING APPARATUS FOR RADIOGRAPHIC IMAGE SIGNALS

BACKGROUND OF THE INVENTION

The present invention relates to a processing apparatus for radiographic image signals, and particularly to image processing (frequency processing) in a medical radiographing system.

A radiographic image such as an X-ray image is widely used for medical purposes. There is a known radiographic method in which a fluorescent material layer (fluorescent screen) is irradiated with radioactive rays passed through an object, and a film to be developed, on which a silver halide photosensitive material is coated, is irradiated with a visible light emitted from the fluorescent screen.

Recently, due to the progress of radiographic image diagnosis technology, a method has been invented by which the aforementioned radiograph is scanned, a radiographic image information recorded on the radiograph is read out, and the read out image information is regenerated on a CRT or a photosensitive material after it has been digitalized. Due to the aforementioned, various diagnostic information can be obtained from radiography at one time, and thereby diagnosis can be improved and an exposure dose can be lowered. This is expected from the following, in which the radiographic image information can be stored, and information retrieval can be conducted efficiently.

In the radiographic image information reading apparatus using a film, a photographing film in which a radiographic image is recorded, is exposure-scanned by a reading light, and the reflected light or the transmitted light at the time is detected by an photo-detector and is converted into an electric signal.

On the other hand, a method has been invented in which the radiographic image information is obtained without using a radiographic film made of a silver halide photosensitive material. In this method, radioactive rays which have passed through a subject are made to be absorbed into some kind of a fluorescent substance, then the fluorescent substance is excited by, for example, light or heat energy, thereby radioactive ray energy which is accumulated in the fluorescent substance by the aforementioned absorption is radiated as fluorescent light, and the fluorescent light is detected, so that the image can be formed. Concretely, this method is disclosed in, for example, U.S Pat. No. 3,859,527, or Japanese Patent Specification Open to Public Inspection No. 12144/1980. According to these disclosures, a stimulative fluorescent substance is used, and a radiographic image conversion method in which a visible light or infrared ray is used as a stimulation excitation light, as follows. A radiographic image conversion panel which a stimulative fluorescent substance layer is formed on a support, is used; the stimulative fluorescent substance layer is irradiated with the radioactive rays which have passed through a subject, and radioactive ray energy corresponding to radioactive ray transmittance of each portion of the subject is accumulated to form a latent image; then, the stimulative fluorescent substance layer is scanned by the aforementioned stimulation excitation light, and thereby the radioactive ray energy which is accumulated in each portion of the radiographic image conversion panel is radiated and converted into light; and a light signal according to the strength of the light is detected by a photoelectric conversion element such as a photo-multiplier, a photodiode, or the like so that the radiographic image information can be obtained.

On the other hand, there is a method in which: radioactive rays which have transmitted through the subject is absorbed in an uniformly charged semiconductor panel having a photoconductive layer composed of selenium, silicon, or the like so that a latent image can be formed, and after that, the electrostatic latent image on the panel is electrically detected by optical scanning of the semiconductor panel so that the image can be formed. (For example, refer to Japanese patent Specification Open to Public Inspection No. 31219/1979).

The radiographic image information thus obtained, is used without being further processed, or after being image-processed in order to improve the diagnostic property of an X-ray image, by conducting spatial frequency processing or gradation processing, and is outputted onto a silver halide film, or a CRT to be visualized, or stored in an image memory such as a semiconductor memory, a magnetic memory, an optical disc memory or the like, and after that, it is read out as necessary from these image memories and outputted onto a silver halide film, a CRT or the like to be visualized.

As one of the aforementioned spatial frequency processing methods, the following method has been known in which an unsharpness mask signal Sus is obtained, and an original image signal Sorg, the unsharpness mask signal Sus and an emphasis factor $\beta$ are used in the following equation, $$S' = \text{Sorg} + \beta(\text{Sorg} - \text{Sus})$$

Due to this equation, spatial frequency emphasis, so-called edge emphasis can be conducted so that the sharpness of the image can be improved. (Refer to Japanese Patent Examined Publication No. 62372/1987.)

However, in the above-described spatial frequency processing method, there is a problem in which a large number of operations are required, and it is difficult to conduct image processing in real time. Further, in the above-described method, there are problems in which image noises are emphasized since a high spatial frequency area is emphasized, and thereby, image quality is lowered due to the image noises. In particular, the method has a disadvantage in that the image quality is extremely low in a portion in which a quantity of radiation is small (the signal is small).

In view of the foregoing, an object of the present invention is to provide a new frequency processing apparatus in which arithmetic processing is simple, and the processing speed is improved. Another object of the present invention is to provide a new frequency processing apparatus in which image quality of a portion having a small signal is not deteriorated due to noises even when contrast (sharpness) of a high frequency area is improved. The first object of the present invention is to provide a new frequency processing apparatus in which image quality deterioration of a portion having a small signal due to noises can be improved while contrast in the high frequency area is maintained.

DETAILED DESCRIPTION OF THE INVENTION

Further, the present invention relates to an improvement of a device by which an unsharpness mask processing is conducted on an original radiographic image signal using an unsharpness mask signal.

In X-ray photography, the dynamic range of a quantity of X-rays after passing through the subject is exceedingly wide, and therefore it is difficult for an entire area ranging from a portion of high X-ray absorption (a low density portion) to a portion of low X-ray absorption (a high density portion) to express on a film with excellent contrast.

In photography of a chest portion, for example, as shown in FIG. 17, a histogram of a quantity of transmitted X-rays is widely distributed, ranging from a lung field portion to a mediastinum. On the other hand, as shown in FIG. 17, gradation of a film has a wide density range (a gradation curve has a large inclination) which is obtained corresponding to an exposure energy variation, and an exposure energy range, in which an excellent gradation characteristic is obtained, is limited to a portion.

In the photography of the chest portion, the main region of interest is generally a lung field portion, and a subsidiary region of interest is a mediastinum portion (a vertebra portion), and therefore photographing conditions such as the quantity of irradiated radiation are set so that the lung field portion can correspond to a range in which an inclination of the gradation curve is large and excellent gradation characteristics can be obtained. Accordingly, the mediastinum portion corresponds to a portion in which inclination of the gradation curve is small (a portion enclosed by a dotted line in FIG. 17). Therefore, although excellent contrast is obtained in the lung field portion, contrast is low in the mediastinum portion.

Similarly, when the digital radiographic image signal is gradation processed and outputted onto a film, generally, a gradation conversion table used for the gradation processing, also has a large density range in a signal range corresponding to the lung field portion which is a region of interest, and has high contrast in the lung field portion. Accordingly, a large density range can not be secured in a signal range corresponding to a mediastinum portion, and thereby contrast is lowered in the portion, and therefore it is difficult to solve the aforementioned problems by only gradation processing.

In the aforementioned, when a density of the subsidiary region of interest (the mediastinum portion) is allowed to come near the main region of interest entirely (the lung field portion) as shown in FIG. 18, (the dynamic range can be compressed), the aforementioned problems can be solved, so that both the contrast of the main region of interest and the subsidiary region of interest can be secured. Hereinafter, the compression of the dynamic range as described above is referred to as equalization.

As a method of the aforementioned equalization, various kinds of density compensation filters are used in X-ray photography. As shown in FIG. 19, the density compensation filter having characteristics in which a light transmission ratio is high in a portion where an X-ray absorption of the subject is high, and the light transmission ratio is low in a portion where the X-ray absorption is low, is inserted between a fluorescent screen and a film, and thereby, a dispersion range of an amount of exposure onto the film due to dispersion of the X-ray absorption of the subject, can be decreased (the dynamic range is compressed).

However, in the method using the density conversion filter, there are the following problems in which: it is troublesome to attach the filter when photographing; there is a possibility in which an amount of information is partially lowered since a fine density compensation can not be conducted; and further, the density compensation is conducted in the opposite direction to a predetermined direction when the density compensation filter does not properly match with the subject.

A method in which an unsharpness mask signal is used as a method of equalization by image signal processing, is effective since it has no problems such as mismatch of the filter in the method using the density compensation filter, and optimum processing can be conducted on each image. However, there is a problem in that it takes a long period of times for a calculation of the unsharpness mask signal.

The present invention has been invented according to the aforementioned problems, and the second object of the present invention is to provide a radiographic image processing apparatus characterized in that: the unsharpness mask signal can be calculated in a short period of time, and thereby unsharpness mask processing can be conducted in a short period of time; and both the original image and the image processed with the unsharpness mask can be obtained in a short period of time without a large memory capacity.

SUMMARY OF THE INVENTION

In order to attain the first object, a processing apparatus for radiographic image signals according to the present invention is structured as follows.

In FIG. 1, a photographing means detects an amount of radioactive rays transmitted through an object and converts them into a digital radiographic image signal, and a low frequency component decreasing means decreases an amplitude of a low spatial frequency component of the digital radiographic image signal which is obtained by the aforementioned photographing means.

At this point, it is preferable that the aforementioned low frequency component decreasing means is structured as follows. That is, the unsharpness mask signal corresponding to a predetermined low spatial frequency is obtained from a digital radiographic image signal obtained in the image photographing means. The value which is obtained from the unsharpness mask signal multiplied by a predetermined decreasing factor, is subtracted from the digital radiographic image signal obtained from the photographing means, and thereby amplitude of a component having a frequency not higher than the predetermined low spatial frequency is decreased.

In this structure, the amplitude in a low spatial frequency area of the digital radiographic image signal is decreased, compared with the amplitude in a high spatial frequency area, and therefore a signal in the high spatial frequency area can be relatively frequency emphasized. Due to this, the contrast (sharpness) of signals is improved, and an image appropriate for a diagnosis can be reproduced.

Since the signal in the low spatial frequency area is decreased, a variation width of a transmission factor of an object is relatively decreased, so that a variation width of a variable density portion having a relatively large area in the radiographic image can be decreased. Due to this, without decreasing contrast (sharpness) of the high spatial frequency area, a portion of an object through which the radioactive ray can be easily transmitted, and a portion of the object through which the radioactive rays can not easily be transmitted, can be reproduced so that they can both be easily observed at the same time. Further, an S/N ratio of the portion of the object through which the radioactive rays can not easily be transmitted, can be increased thereby, and lowering of image quality caused by noises can be improved.

When amplitude of the low spatial frequency area of the digital radiographic image signal is decreased, it can be easy for the amplitude of the spatial frequency area not higher than a predetermined low spatial frequency to be decreased by desired characteristics, in the following manner in which: an unsharpness mask signal corresponding to a predetermined low spatial frequency is obtained from the digital radiographic image signal; and the value which is obtained by multiplying the unsharpness mask signal by a predetermined decreasing factor, is subtracted from the original digital radiographic image signal.

In order to accomplish the second object, the radiographic image processing apparatus according to the present invention is structured as shown in FIG. 6. The unsharpness mask signal processing is conducted on the original radiographic image signal using the unsharpness mask signal corresponding to an ultra-low spatial frequency of the original radiographic image signal which is composed of digital data of each pixel.

In FIG. 6, an unsharpness mask signal calculation means sets a plurality of sampling points selected on the radiographic image, conducts filtering processing using only signal values of the sampling points which are involved in a predetermined mask, and calculates the unsharpness mask signal corresponding to the each sampling point.

An interpolation calculation means conducts the interpolation calculation on the image signal for processing which is calculated by using the calculated unsharpness mask signal or the unsharpness mask signal, and converts it into an image having the same number of pixels as the number of pixels of the original radiographic image signal.

An unsharpness mask processing means conducts unsharpness mask processing on the original radiographic image signal by using the unsharpness mask signal having the same number of pixels as that of the original radiographic image signal which is calculated by the interpolation calculation means, or the image signal for processing.

In the aforementioned, the unsharpness mask signal calculation means can be structured in the manner that: it is composed of a sampling point image forming means which forms a reduced sampling point image composed of the image signal of the each sampling point except for the image composed of the original radiographic image signal; and it conducts the aforementioned filtering processing and the calculation for the unsharpness mask signal according to the sampling point image.

It is preferable that a memory means, in which the original radiographic image signal and the image signal for processing calculated by using the unsharpness mask signal before the interpolation calculation by the interpolation calculation means, or the unsharpness mask signal, are stored respectively, is provided, and that the interpolation calculation and unsharpness mask processing are conducted respectively, according to the image signal which is read from the memory means, by the interpolation calculation means and the unsharpness mask processing means.

Further, filtering processing using a median value is preferable for the filtering processing in the unsharpness mask signal calculation means.

According to this structure, when the unsharpness mask signal is calculated, a plurality of sampling points selected on the original radiographic image are set, and filtering processing is conducted by using only signal values of the sampling points contained in the mask, not by using entire signal values of the pixels contained in a predetermined mask on the original image. Further, the calculation of the unsharpness mask signal by the aforementioned filtering processing is not conducted on entire pixels on the original radiographic image, but the unsharpness mask signal is calculated on each sampling point. The aforementioned sampling point is the pixel which is selected from the original radiographic image, and therefore, the number of pixels of the unsharpness image signal is smaller than that of the original radiographic image, and the number of pixels is set to that of the original pixels by the interpolation calculation before the unsharpness mask processing of the original radiographic image signal is conducted finally.

When the unsharpness mask signal is calculated, only the signal value of the sampling point is necessary. Therefore, the apparatus can be structured in the following manner: the reduced sampling point image (reduced original image) composed of the image signal of each sampling point is formed separately from the image composed of the original radiographic image signal; and the unsharpness mask signal is made according to the sampling point image without using the image composed of the original radiographic image signal.

Further, when the original radiographic image signal and the unsharpness mask signal before the interpolation calculation or the image signal for processing are stored respectively, the signal before the interpolation calculation is composed of only the signal value corresponding to the sampling point, and it has a small amount of data. Therefore, the original radiographic image signal on which unsharpness mask processing is not conducted, is obtained without increasing greatly a memory capacity of the memory means, and when the processed image is necessary, the image signal, on which the unsharpness mask processing is conducted, can be calculated immediately.

Further, when filtering processing using a median value is conducted, the median filter has the characteristics in which an edge information, in which the density of the filter changes rapidly, can be preserved, and thereby the unsharpness mask signal by which the rough change of the original image is accurately reflected, can be obtained.

DETAILED DESCRIPTION OF THE PREFERRED EMBODIMENT

Figure 1:
FIG. 1 is a block diagram showing a structure of the present invention in order to accomplish the first object.
Figure 2:
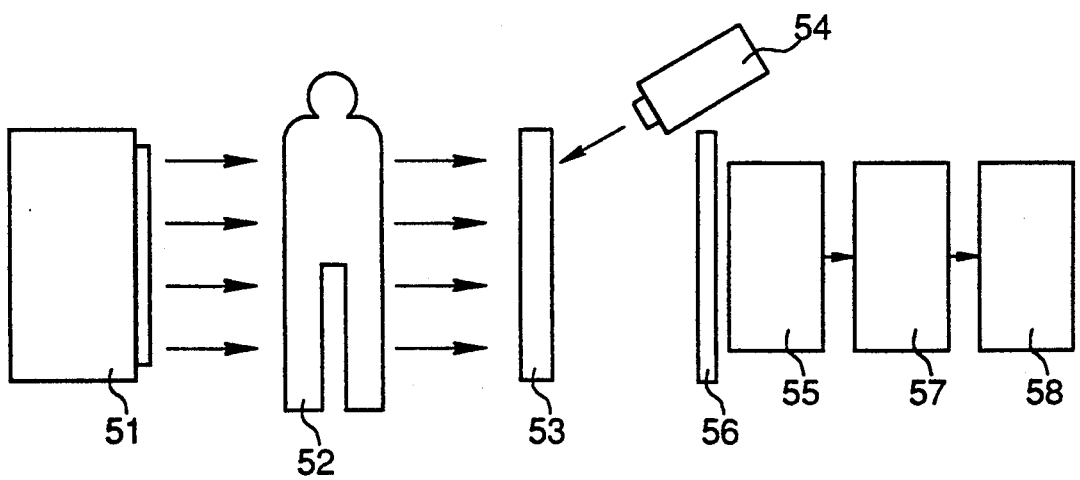
FIG. 2 is a schematic illustration showing a system of an example of the present invention.

The present invention will be described as follows. FIG. 2 is a view showing a basic structure of a reproduction apparatus for radiographic image photographing, and shows an example in which it is applied to radiographing of a human body for a medical purpose.

In FIG. 2, a radioactive ray generating apparatus 51 irradiates radioactive rays such as X-rays or the like onto an object (such as a human chest portion or the like) 52. The object 52 is disposed between the radioactive ray generating apparatus 51 and a stimulative fluorescent plate 53. The stimulative fluorescent plate 53 records energy according to distribution of a radioactive ray transmission ratio (an amount of transmitted rays) of the object 52 to a quantity of radiation irradiated from the radioactive ray generating apparatus 51 on the stimulation fluorescent layer, and the latent image of the object 52 is formed on the layer.

In the aforementioned stimulative fluorescent plate 53, a stimulation fluorescent layer is provided on a support by vapor phase accumulation of a stimulative fluorescent substance, or coating of a stimulative fluorescent substance. The stimulation fluorescent substance layer is shielded or covered by a protective member in order to protect the layer from an unfavorable effect due to environment and damage. As stimulative fluorescent materials, there are used materials which are disclosed in Japanese Patent Specification Open to Public Inspection No. 72091/1986, or No. 75200/1984.

On the other hand, the image information is read out from the stimulative fluorescent plate 53, on which the radiographic image information of the object is recorded, in the following ways.

A stimulation excitation light source (a gas laser, a solid state laser, a semiconductor laser, etc.) 54 generates an excitation light beam in which outgoing beam strength is controlled, and the excitation light beam scans the stimulative fluorescent plate 53 on which the radiographic image information is recorded, and the radioactive ray energy which is accumulated on the stimulative fluorescent plate 53 (a latent image) is emitted as a fluorescent light (stimulation emission).

A photoelectric conversion unit 55 receives the fluorescent light (stimulation emission) which is irradiated by scanning on the stimulation fluorescent plate 53 by excitation beams, through a filter 56 by which only the fluorescent light (stimulation emission light) can be passed, and the light is photoelectrically converted into a current signal corresponding to an incident light at every scanning point, so that the radiographic image signal at every scanning point can be obtained.

An analog radiographic image signal which is photoelectrically read out by the photoelectric conversion unit 55, is successively A/D converted by an A/D converter not shown in the drawing, and outputted to an image processing unit 57, in which a microcomputer is provided, as a digital radiographic image signal. Accordingly, in the example, an image photographing means is composed of the stimulative fluorescent plate 53, the stimulative excitation light source 54 and the photoelectric conversion unit 55.

In the image processing unit 57, the digital radiographic image signal is processed by image processing such as gradation processing or the like, calculation processing is conducted in order to decrease amplitude of the low spatial frequency component, a digital radiographic image signal from the photoelectric conversion unit 55 is processed into a signal appropriate to the diagnosis, and after that, the signal is outputted to a radiographic image reproduction unit 58. Accordingly, in the present example, the image processing unit 57 is provided with the function of the low frequency component decreasing means.

The radiographic image reproduction unit 58 is a monitor such as a printer or a CRT, into which the digital radiographic image signal, processed in the image processing unit 57, is inputted, and the photographed radiographic image is visualized as a hard copy or a reproduced soft copy.

In the aforementioned, a memory (filing system) such as a semiconductor memory may be provided together with the radiographic image reproduction unit 58, or instead of the radiographic image reproduction unit 58 so that the radiographic image signal can be stored.

Further, in the present example, the digital radiographic image signal is obtained by reading out the radiographic image information recorded on the stimulative fluorescent plate 53 as described above, however, the example may be structured in the manner that a transmission amount of radioactive rays passed through the object 52 is directly detected by a semiconductor detector such as a CCD line sensor so that the digital radiographic image signal can be obtained. Further, the digital radiographic image signal may be obtained by the following structure in which: the radioactive rays passed through the object are irradiated on a screen film; and an image on the film which is obtained by developing the film is read out by a reading device, and therefore, the structure of the photographing means to obtain the digital radiographic image signal should not be limited to the above-described examples.

Processing which is conducted in the aforementioned image processing apparatus 57 in order to decrease amplitude of a low spatial frequency component, will be described as follows.

In the image processing unit 57, the digital radiographic image signal inputted from the photoelectric conversion unit 55, is stored, and the unsharpness mask signal Su is obtained from the stored data. When the stored original digital radiographic image signal is defined as So, the decreasing factor is defined as K ($0 < K \leq 1$), and calculation of the following equation is conducted, $$S = So - K \cdot Su$$

the digital radiographic image signal S, in which the amplitude of the component whose frequency is not higher than the predetermined low spatial frequency is decreased, is obtained, and the signal S is image processed by gradation processing or the like, and then the signal is outputted to the radiographic image reproduction unit 58.

The gradation processing is necessary in order to display the radiographic image under preferable conditions for diagnosis, and it is used in combination with spatial frequency processing. At this point, the gradation processing may be conducted after the spatial frequency processing, or it may be conducted before the spatial frequency processing. The gradation processing itself may be conducted in the following manner: an analog signal is processed before A/D conversion or after D/A conversion in an analog circuit; or a digital signal is digitally processed in a computer.

In processing by which the digital radiographic image signal S, in which amplitude of a component having a frequency not higher than the predetermined low spatial frequency is decreased, is obtained, processing by the following equation may be conducted in order to standardize a value of the modulation transfer function near zero spatial frequency.

$$S' = So/(1-K) - K \cdot Su/(1-K)$$

As an unsharpness mask signal Su, when the spatial frequency is 0.5 cycle/mm, it is preferable that the unsharpness mask signal, whose modulation transfer function is lower than 0.5, is used. Further, it is more preferable that the unsharpness mask signal, whose modulation transfer function is higher than 0.5 when the spatial frequency is 0.01 cycle/mm, and the modulation transfer function is lower than 0.5 when the spatial frequency is 0.5 cycle/mm, is used.

The unsharpness mask signal Su can be made by the following methods.

As the most basic first method, an original radiographic image signal So is stored, signal at each scanning point is read out with data of the peripheral portion according to the size of the unsharpness mask, and the unsharpness mask signal Su is obtained from their mean value (mean, or various weighted mean).

As the second method, after the original signal So has been read out from the stimulative fluorescent plate 53 with a beam of a small diameter generated by the stimulative excitation light source 54, when the image information remains on the stimulative fluorescent plate 53, a signal at each scanning point is read out together with signals located at the peripheral portions after averaging them by using a light beam of a large diameter corresponding to the size of the unsharpness mask signal.

As the third method, there is a method in which a diameter of the light beam for reading out is gradually spread by scattering in the fluorescent substance layer, and therefore, an original signal So is made by an emission signal from an incident side of the light beam, and the unsharpness mask signal Su is made by an emission at the side through which the light beam is transmitted. In this case, the size of the unsharpness mask signal can be controlled by changing the degree of scattering of light on the fluorescent substance layer, or a size of an aperture by which the scattered light is received.

As the fourth method, there is a method in which an analog signal is processed by a low pass filter in the scanning direction of a beam (the primary scanning direction), and the digital radiographic signal after A/D conversion is processed by the method of averaging in the subsidiary scanning direction.

In the aforementioned, in amplitude decreasing of a component, whose frequency is lower than a predetermined low spatial frequency, by using the unsharpness mask signal Su, when a modulation transfer function M0 in the vicinity of zero spatial frequency before the amplitude is decreased, is defined as a reference, it is preferable in order to provide an image appropriate to a diagnosis that the value of the transfer function is decreased to $0.2 \geq M0 \geq 0.9$, and it is more preferable that the transfer function is decreased to $0.3 \geq M0 \geq 0.8$. Further, when the value is $0.68 \geq M0 \geq 0.80$, the obtained image can be offered for the diagnosis without any difficulty compared with a system using a conventional screen film.

According to the aforementioned, the decreasing factor K is preferably $0.1 \geq K \geq 0.8$, and is more preferably $0.2 \geq K \geq 0.7$. Further, the most preferable range of decreasing factor is $0.20 \geq K \geq 0.32$.

Figure 3:
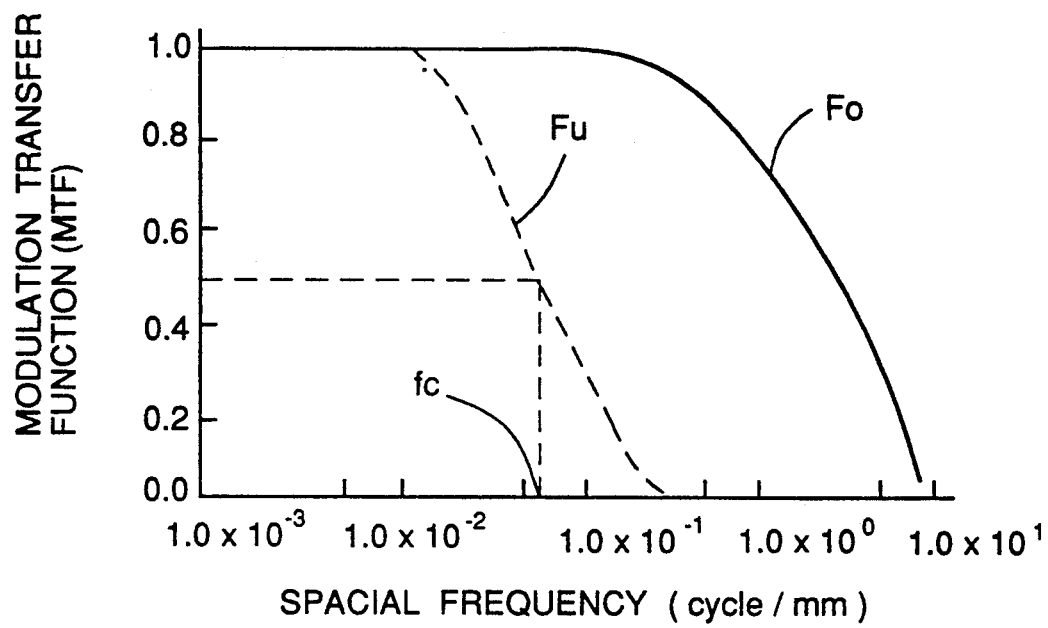
FIG. 3 is a diagram showing spatial frequency response characteristics of an original radiographic image signal $S_o$ and an unsharpness mask signal.

The shape of the spatial frequency response characteristic curve of the unsharpness mask signal is determined, depending on: in which value of the spatial frequency fc that is lower than 0.5 cycle/mm, the value of the modulation transfer function should be 0 5 (refer to FIG. 3). The shape of the spatial frequency response characteristic curve of the unsharpness mask signal must be specified before processing. A value of the decreasing factor K must be also specified before processing. The following methods are considered for these values in which: these values are inputted into the outer input device individually; these values are selectively inputted from a plurality of values which are set previously according to a portion of a human body or a case of a disease when a photographing portion is specified; or further, the read out image data are analyzed and the preferable values are automatically set.

Figure 4:
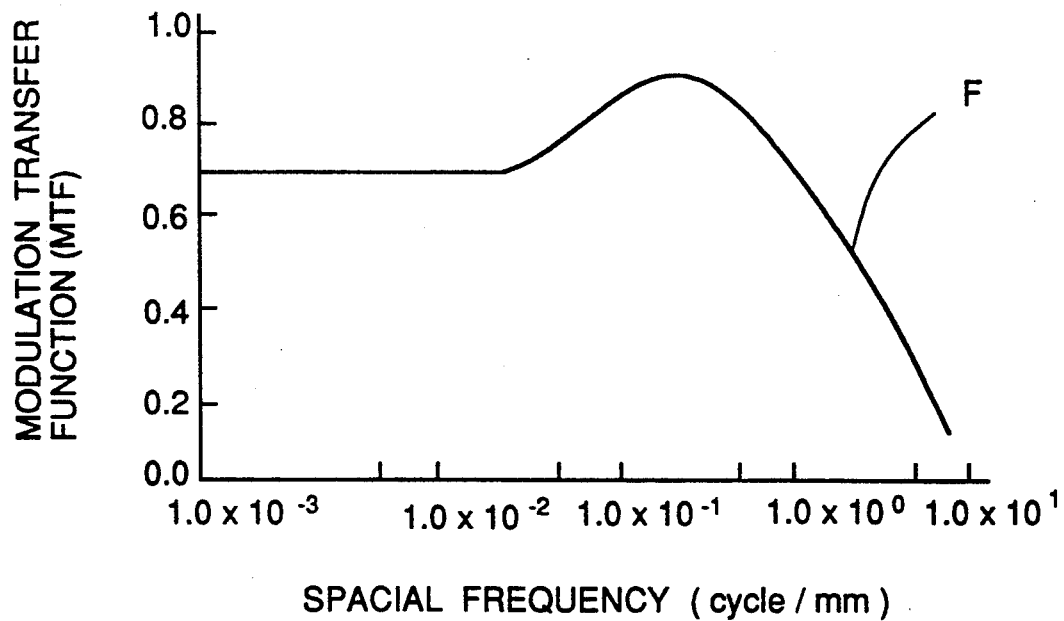
FIG. 4 is a diagram showing a spatial frequency response characteristic of a result obtained by decreasing amplitude of a spatial frequency component.

Due to the aforementioned, when the value obtained by multiplying the unsharpness mask signal Su by the decreasing factor K is subtracted from the original digital radiographic image signal So, as shown in FIG. 4, an image signal having the spatial frequency response characteristics in which amplitude of a component of the signal whose frequency is lower than a predetermined low spatial frequency has been decreased with regard to the original signal, can be obtained.

When the amplitude of the component of the image whose frequency is lower than a predetermined low spatial frequency, is decreased, the image which has been signal processed, becomes an image in which a width of variation of the radioactive ray transmission ratio is relatively decreased even when the portion through which the radioactive rays can be easily transmitted, and the portion through which the radioactive rays can not be easily transmitted, for example, like a lung field and a mediastinum in the case of photographing of a human chest portion, exist at the same time.

Accordingly, a portion through which the radioactive rays can be easily transmitted, and a portion through which the radioactive rays can not be easily transmitted, can be reproduced so that both portions are easily observed at the same time, and amplitude of the component of the signal in the spatial frequency area other than the low spatial frequency area is the amplitude of the original signal, and therefore, contrast in a high spatial frequency area is secured, diagnostic information such as a blood vessel or a small change to a morbid state, or the like are not damaged by the frequency processing, and thereby an image superior in diagnostic property can be obtained.

Further, when amplitude decreasing is conducted to a relatively high spatial frequency area, amplitude of the signal in the high spatial frequency area is increased compared with amplitude in middle, and low frequency areas, and therefore, an edge portion of the image is emphasized. In this frequency processing, then, contrast (sharpness) of the image can be improved apparently.

Next, referring to FIGS. 3, 4, and 5, the aforementioned frequency processing will be explained more concretely as follows.

Fo in FIG. 3 shows the spatial frequency response characteristics of the original digital radiographic image signal obtained when a radiographic image accumulated on the stimulative fluorescent plate 53 is sampled in the size of 100 μm/1 pixel. Fu shows the spatial frequency response characteristics of a Gaussian distributed unsharpness mask signal which is set so that a modulation transfer function at 0.5 cycle/mm is not higher than 0.5. In this example, the unsharpness mask signal is made in the way in which the aforementioned image sampled in the size of 100 μm/1 pixel is weighted in the shape of Gaussian distribution when the process of an additional average mean is conducted on the image diveding in a matrix of 80 pixels×80 pixels. In the drawing, fc is a spatial frequency when the modulation transfer function is 0.5.

Figure 5:
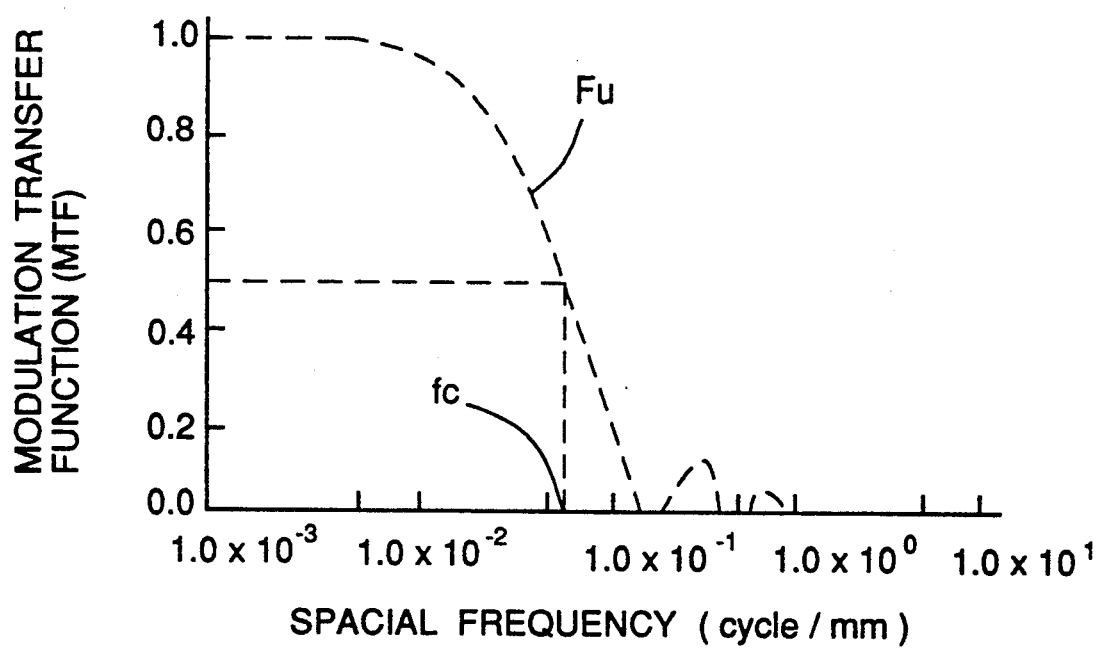
FIG. 5 is a diagram showing a spatial frequency response characteristic in the case where it is made by the method of a simple addition means without conducting weighting of the unsharpness mask signal.
Figure 6:
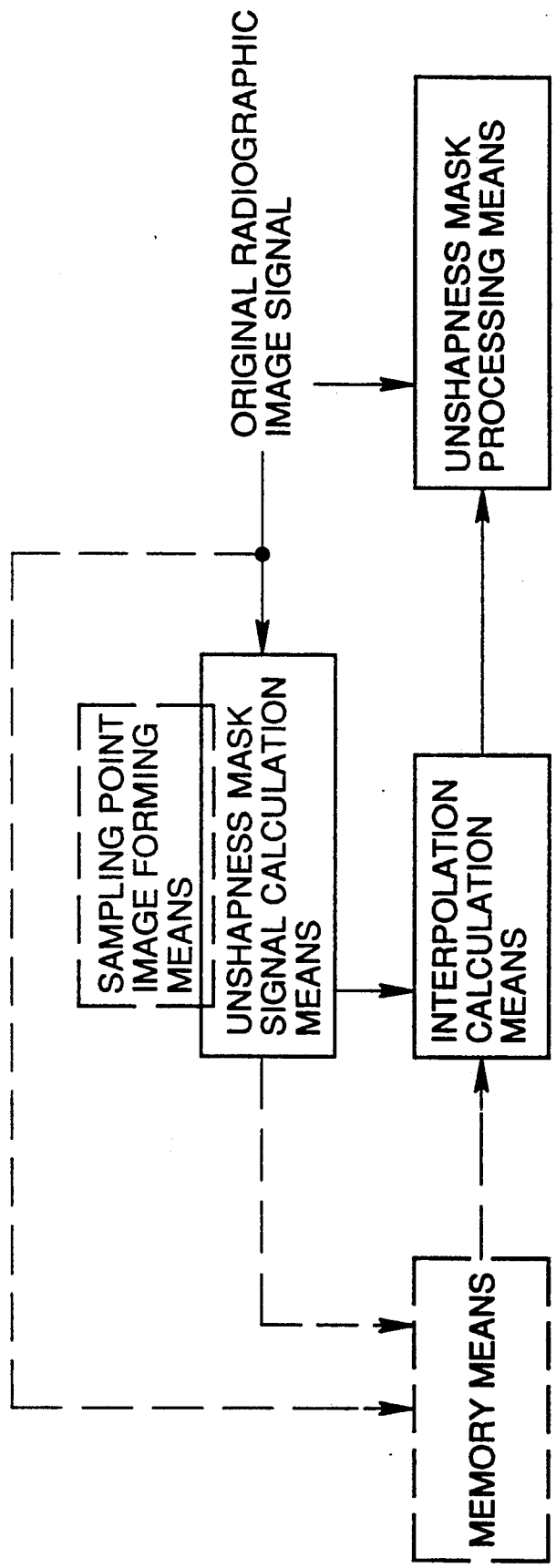
FIG. 6 is a block diagram showing a basic structure of the invention in order to accomplish the second object.

In the aforementioned, the unsharpness mask signal Su may be made in the way in which weighting is neglected and only a simple additional average mean may be conducted, and the spatial frequency response characteristics of the rectangular unsharpness mask signal in the above-described case is shown in FIG. 5. However, the shape of the unsharpness mask is not necessarily a square matrix formed by 80 pixels×80 pixels, but it may be a rectangle.

FIG. 4 shows the spatial frequency response characteristics F of the signal S which is obtained by calculation (So−K·Su), and in this example, the decreasing factor is 0.3. The decreasing factor K is fixed usually at a predetermined value. However, when the decreasing factor K can be changed corresponding to a value of the original digital radiographic image signal So or the unsharpness mask signal Su, a degree of amplitude decreasing of the signal in the low spatial frequency area can be changed in a low signal area and a high signal area, and thereby an image in which diagnostic property is increased, can be provided.

As described above, according to the present invention, when amplitude of the low spatial frequency component of the radiographic image signal is decreased, a signal in the high spatial frequency area can be relatively frequency emphasized, and thereby contrast of a signal in the high spatial frequency area can be improved. Further, when the amplitude of the low spatial frequency component is decreased, a range of variation of the radioactive ray transmission ratio of the object is seemingly decreased, and thereby a portion through which the radioactive ray can be easily passed, and a portion through which it can not be easily passed, can be reproduced so that they can be easily observed at the same time. In a radiographic image for a medical purpose, then, the present invention has excellent advantages in that a reproduced image appropriate to diagnosis can be obtained, and thereby diagnostic property using the radiographic image can be improved.

An example for attaining the second object of the present invention will be explained as follows.

In the method of equalization by means of image processing mentioned above, unsharpness mask signals corresponding to components of ultra-low spatial frequency for image signals of an original are obtained, and after these unsharpness mask signals are multiplied by a coefficient, the original image signals are subjected to addition and subtraction. Since the unsharpness signals mentioned above correspond roughly to light and shade of the original image, a total dynamic range can be compressed by this processing, without taking any action on the contrast of signals corresponding to detailed structures.

The method for compressing a dynamic range by the use of unsharpness mask signals as described above is free from the problem of mismatch such as the one caused in the method using a density compensation filter mentioned above, and is effective because it can perform optimum processing for each image. However, it has a disadvantage that calculation of unsharpness mask signals takes an extremely long time. The reason for this is that each pixel needs operation wherein signal values of many pixels in a mask of an extremely large size are used, when calculating unsharpness mask signals corresponding to components of an ultra-low spatial frequency.

As technology for shortening the operation time for unsharpness mask signals mentioned above, Japanese Patent Publication Open to Public Inspection No. 119250/1986 (hereinafter referred to as Japanese Patent O.P.I. Publication) discloses an art wherein some pixels instead of all pixels in a mask are used on occasion of filtering processing in the mask. Even in this case, each pixel of an original image requires operation of unsharpness mask signals. Therefore, it is not possible to shorten remarkably the operation time for total operation of unsharpness mask signals, though it is possible to shorten the operation time for each pixel.

When a medical image is subjected to image processing, there are some occasions wherein it is important to hold an original image to provide diagnostic information at a later time, and this is also true when compressing a dynamic range. However, in order for an image after processing to be stored together with an original image, memory capacity needs to be doubled, which is a big problem for medical images having a vast amount of information. On the contrary, when taking an arrangement wherein an original image only is stored for solving the problem of memory capacity mentioned above, and whenever an image after processing is required, operation of unsharpness mask signals is conducted each time to obtain a processed image, it takes a long time to obtain the desired processed image.

The second object of the present invention is related to the problems mentioned above and it is to provide a radiographic image processing apparatus wherein operation of unsharpness signals can be conducted in a short period of time, thus, unsharpness mask processing can be provided in a short processing time, and both the original image and unsharpness-mask-processed image can be obtained in a short period of time without requiring a large memory capacity.

Figure 7:
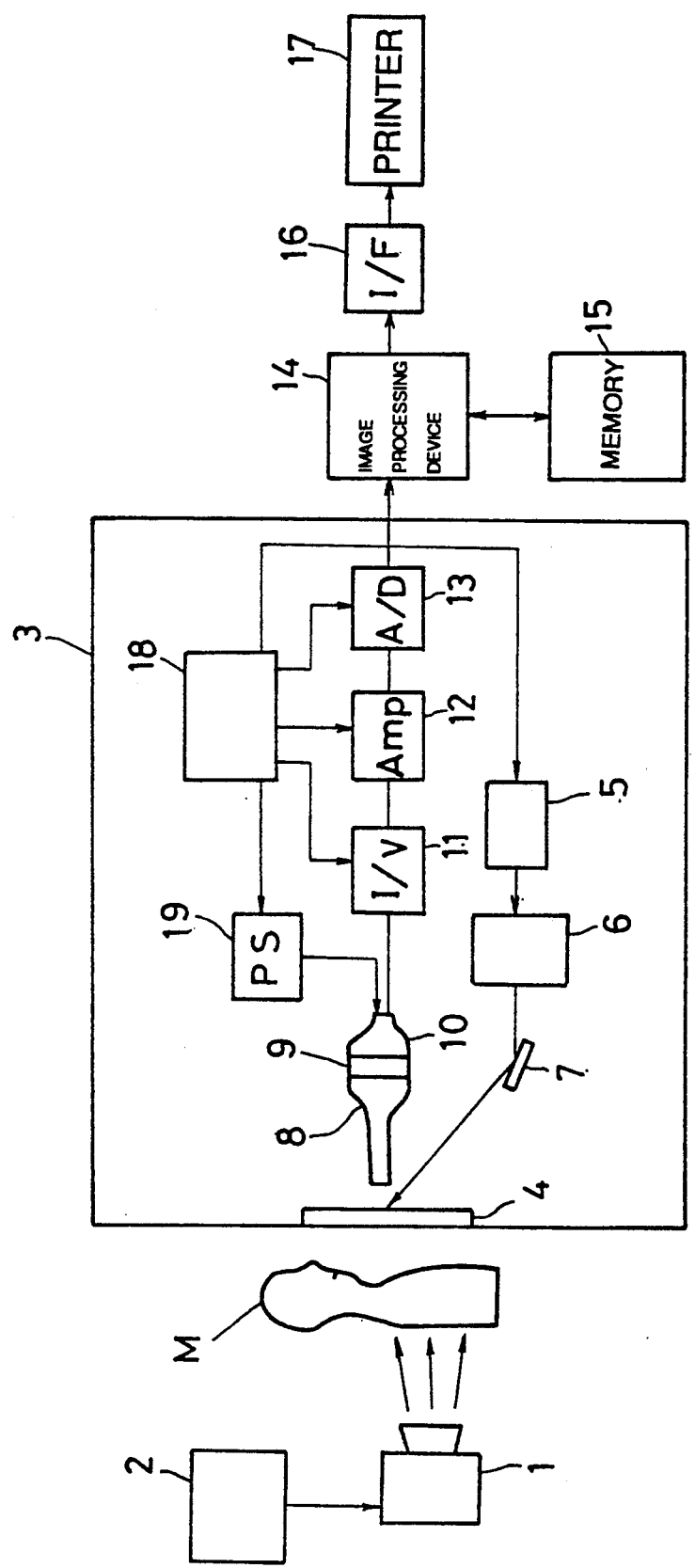
FIG. 7 is a block diagram showing a function and a structure of the example of the present invention.
Figure 8:
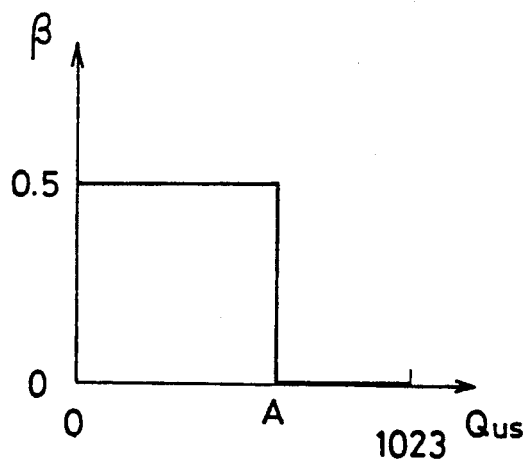
FIG. 8 is a diagram showing preferable characteristics of a correction coefficient $\beta$ which is used for the unsharpness mask processing.
Figure 9:
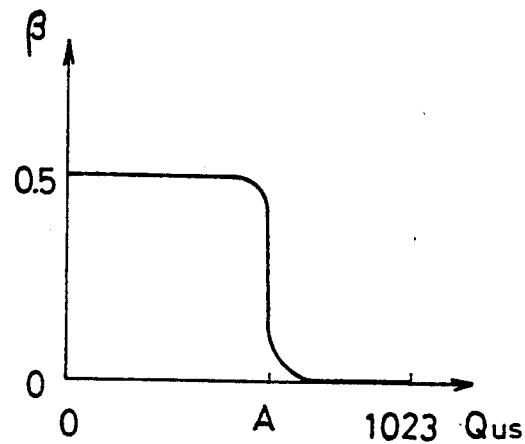
FIG. 9 is a diagram showing preferable characteristics of a correction coefficient $\beta$ which is used for the unsharpness mask processing.

FIG. 7 showing an example represents a radiographic image information reading apparatus including a radiographic image processing device wherein an example of medical application as chest radiography for a person is illustrated.

In FIG. 7, radiation source 1 is controlled by radiation-controlling unit 2, and irradiates radioactive rays (X-rays in general) toward the photographic object (chest region of a person or the like) M. Record-reading unit 3 is provided on its surface facing the radiation source 1 with conversion panel 4 with photographic object M sandwiched therebetween, and the conversion panel 4 stores energy based on radiation transmittance distribution of photographic object M for a quantity of irradiated radiation from the radiation source 1 on the stimulation layer where a latent image of the photographic object M is formed.

The conversion panel 4 mentioned above is provided on its support with a stimulation layer through the method of vapor phase accumulation of a stimulative fluorescent substance or by application of a coating solution of a stimulative fluorescent substance, and the stimulation layer is shielded or covered with a protective member to be protected from an environmental adverse effect and damage. As materials of the stimulative fluorescent substance, the materials disclosed, for example, in Japanese Patent O.P.I. Publication Nos. 72091/1986 and 75200/1984 may be used.

Light beam generator (a gas laser, a solid state laser or a semiconductor laser) 5 generates a light beam whose emission intensity is controlled, and the light beam advances through various optical systems to scanning device 6 where it is deflected and further deflected on reflecting mirror 7 in terms of its optical path, and finally is guided to the conversion panel 4 as stimulative excitation scanning light.

A light-converging end which is an optical fiber on light-converging means 8 is located in the vicinity of the conversion panel 4 scanned with stimulative excitation light, and the light-converging end receives stimulated light whose emission intensity is proportional to latent image energy on the conversion panel 4 scanned with the light beam mentioned above. The numeral 9 is a filter that transmits only light in a stimulated light wavelength region among light guided from the light-converging means 8, and light transmitted through the filter 9 enters photomultiplier 10 where the light incident on the photomultiplier is converted to electric current signals corresponding thereto through photoelectric conversion.

Output current from the photomultiplier 10 is converted to voltage signals by current/voltage converter 11 and then converted to radioactive image signals composed of digital data for each pixel by means of A/D converter 13 after being amplified by amplifier 12.

These digital radioactive image signals (original radioactive image signals) are sent in succession to image processing apparatus 14 having therein a microcomputer.

The numeral 15 is an image memory (a magnetic disk device) wherein images are to be stored, and it is a memory means in the present example. The numeral 16 is an interface from which radiographic image signals readout directly from the image processing apparatus 14 or readout from the aforementioned image memory 15 are transmitted to printer 17. The numeral 18 is a reading gain adjustment circuit with which various adjustments such as adjustment of light beams from light beam generator 15, gain adjustment for photomultiplier 10 by means of voltage adjustment of a high voltage power source for photomultiplier 19, gain adjustment of both current/voltage converter 11 and amplifier 12 and input dynamic range adjustment of A/D converter 13 are made, thus, reading gain for radiographic image signals can be collectively adjusted.

In the aforementioned image processing apparatus 14 having functions as a sample point image forming means, an unsharpness mask signals operation means, an interpolation operation means and an unsharpness mask signals processing means, a dynamic range of original radiographic image signals composed of digital data of each inputted pixel is compressed based on any one of the following operation expressions.

$$Q' = Q + \beta \cdot (A - Qus) \quad (1)$$

$$Q' = Q - \beta \cdot Qus \quad (2)$$

$$Q' = Q + \beta \cdot (Q - Qus) \quad (3)$$

In the above expressions, Q represents original radioactive ray signals, Qus represents unsharpness mask signals corresponding to ultra-low spatial frequency of original radiographic image signals, $\beta$ represents a correction coefficient, A represents a constant and Q' represents image signals after dynamic range compression processing (equalization processing).

Figure 10:
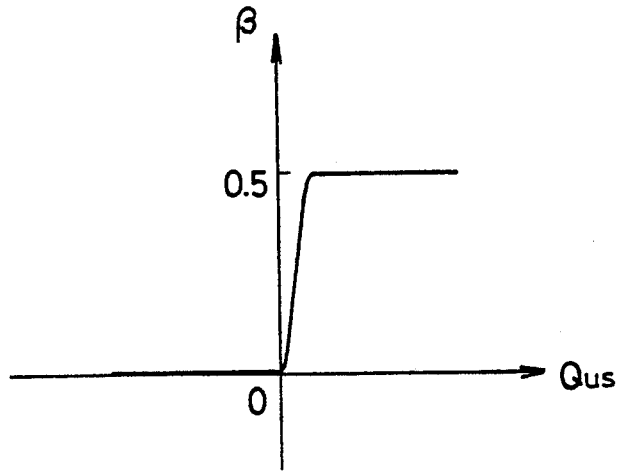
FIG. 10 is a diagram showing preferable characteristics of a correction coefficient $\beta$ which is used for the unsharpness mask processing.

The correction coefficient $\beta$ mentioned above may preferably be established based upon any one of the parameters of Q, Qus, A and (A−Aus) or upon a combination of some of them. When the aforementioned correction coefficient $\beta$ is established based upon Q or Qus, it is preferable that a monotone-decreasing function or a step-decreasing function is used. In particular, the function wherein $\beta$ is zero when a value of A−Aus is negative as shown in FIG. 10 is preferably used. Incidentally, the correction coefficient $\beta$ mentioned above may be established to a constant value in advance or may be established after analyzing each image, and its value being within a range from 0 to 1 is preferable.

The constant A, on the other hand, may be a constant value established in advance, or may be obtained after some image analyses for each image. Establishment of constant A for each image, however, is more preferable because it is a general tendency that the transmission characteristics of radiation and radiographing conditions are different for each photographic object. For example, histogram analysis is conducted for a certain region (a region of interest) in an image, and a value of the constant A may be obtained by the use of values such as a maximum value, a minimum value, a central value and an average value or a combination thereof. It is also possible to obtain a standard value using a cumulative histogram.

In the system arrangement mentioned above, there is given an example of an apparatus for introducing radiographic image signals as direct digital signals by using the conversion panel 4 without a help of a film. However, it is also possible to employ a system wherein a film obtained from direct radiography which employs sensitizing screens and films or from fluorography which employs a mirror camera or the like is read by a reading device such as a scanner and others to obtain digital radiographic image signals.

The above-mentioned system employing no conversion panel 4 is especially preferable when handling a large amount of images because it requires neither film development nor reading by means of a scanner or the like. It is also possible to obtain digital radiographic image signals by using an X-ray CT or the like.

Figure 11:
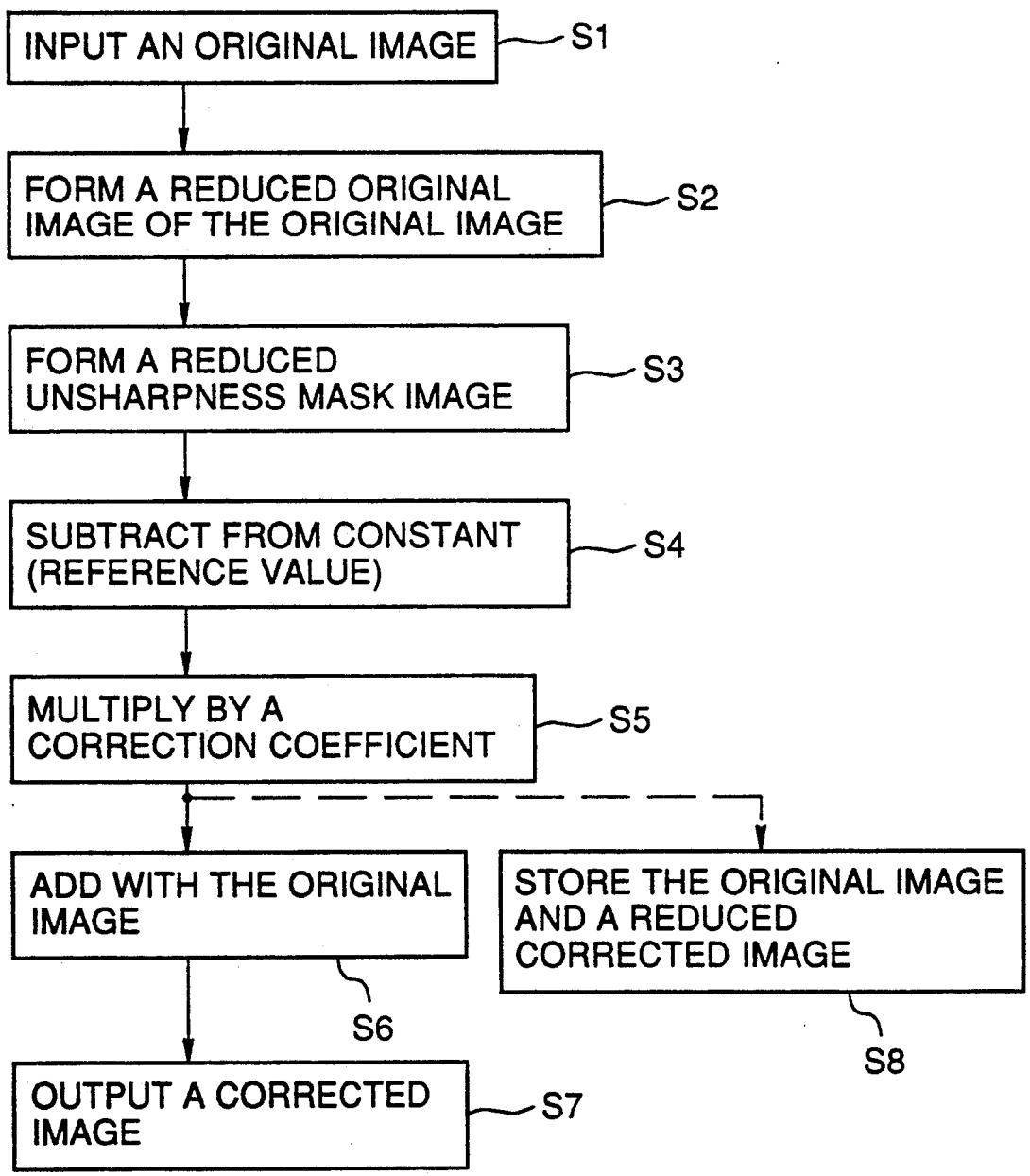
FIG. 11 is a flow chart showing a state of the unsharpness mask processing.

Next, dynamic range compression processing (unsharpness mask processing) using the above-mentioned unsharpness mask signals in the image processing apparatus 14 will be explained in detail, referring to a flow chart in FIG. 11.

Figure 12:
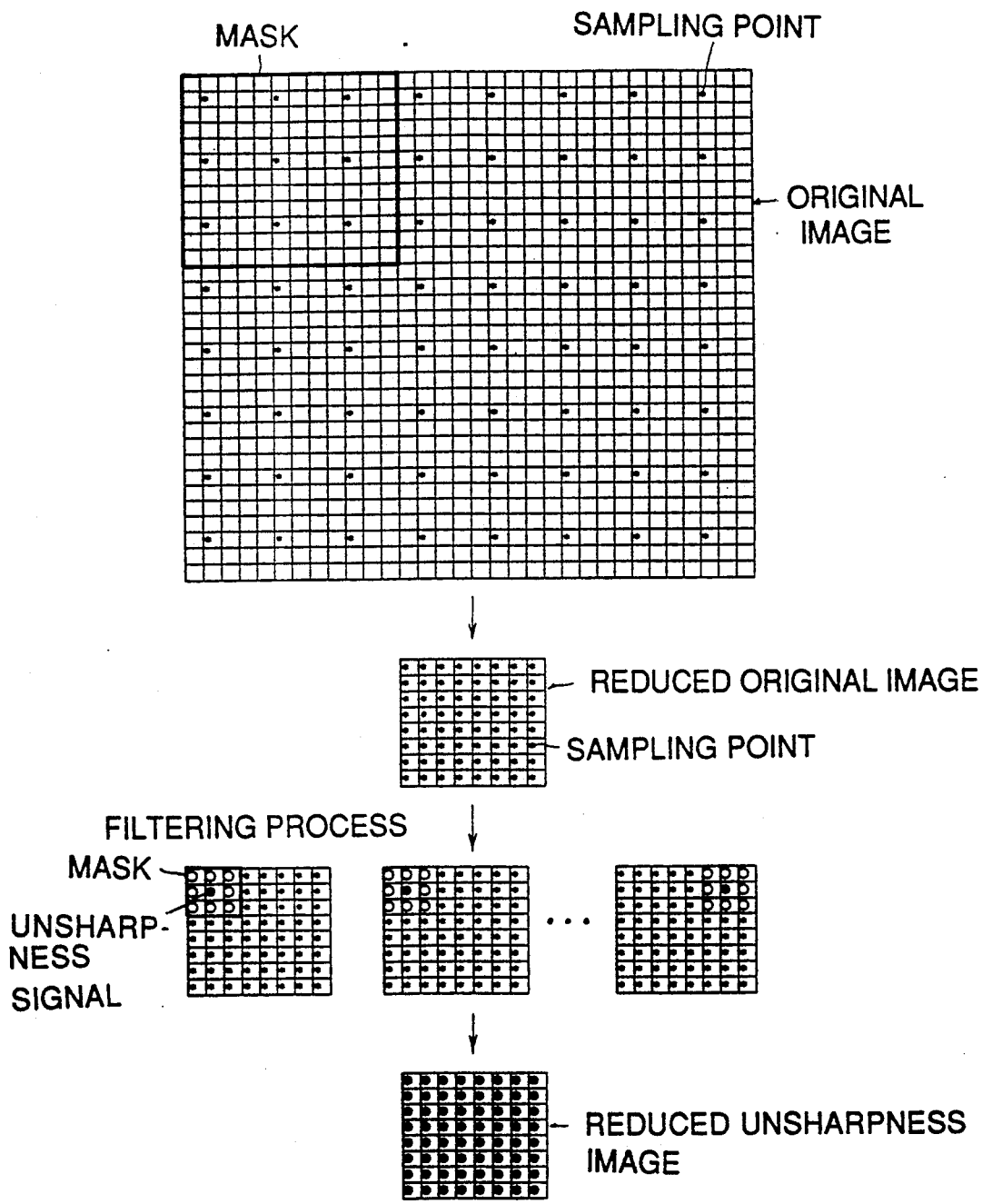
FIG. 12 is a view showing a condition, in which a reduced unsharpness mask signal is made, in an image level.

First of all, while storing (S 1) digital radiographic image signals Q ($2048 \times 2048$ pixels, 10-bit data in the present example) of an original sent in succession from record-reading unit 3, sampling is conducted by thinning out with a constant pixel interval (distance P between sample points, reduction rate 1/P) in both X-axis direction and Y-axis direction (lateral direction and longitudinal direction of an image), and reduced original images composed of a plurality of sample points (pixels after thinning out) selected in the form of lattice points on an original radiographic image are formed, separately from original image signals, on a frame memory built in the image processing apparatus 14 as shown in FIG. 12 (S 2).

Next, unsharpness mask signals Qus corresponding to each sample point are obtained by calculating (filtering processing) a simple mean of signal values of a plurality of sample points included in a square mask whose one side corresponds to pixels in quantity of a and has a sample point at the center thereof for each pixel (a sample point) of the above-mentioned reduced original image, and thereby an image composed of the reduced unsharpness mask signals Qus is formed on the frame memory (S 3).

Incidentally, the size of the above-mentioned mask is determined so that its one side corresponds to 128 pixels on the original radiographic image and a mask size a on the reduced original image may keep the relation of $a \times P = 128$. For filtering processing for obtaining the above-mentioned unsharpness mask signals, various weighted means, median values and mode values may also be used in addition to the above-mentioned simple mean.

Figure 20:
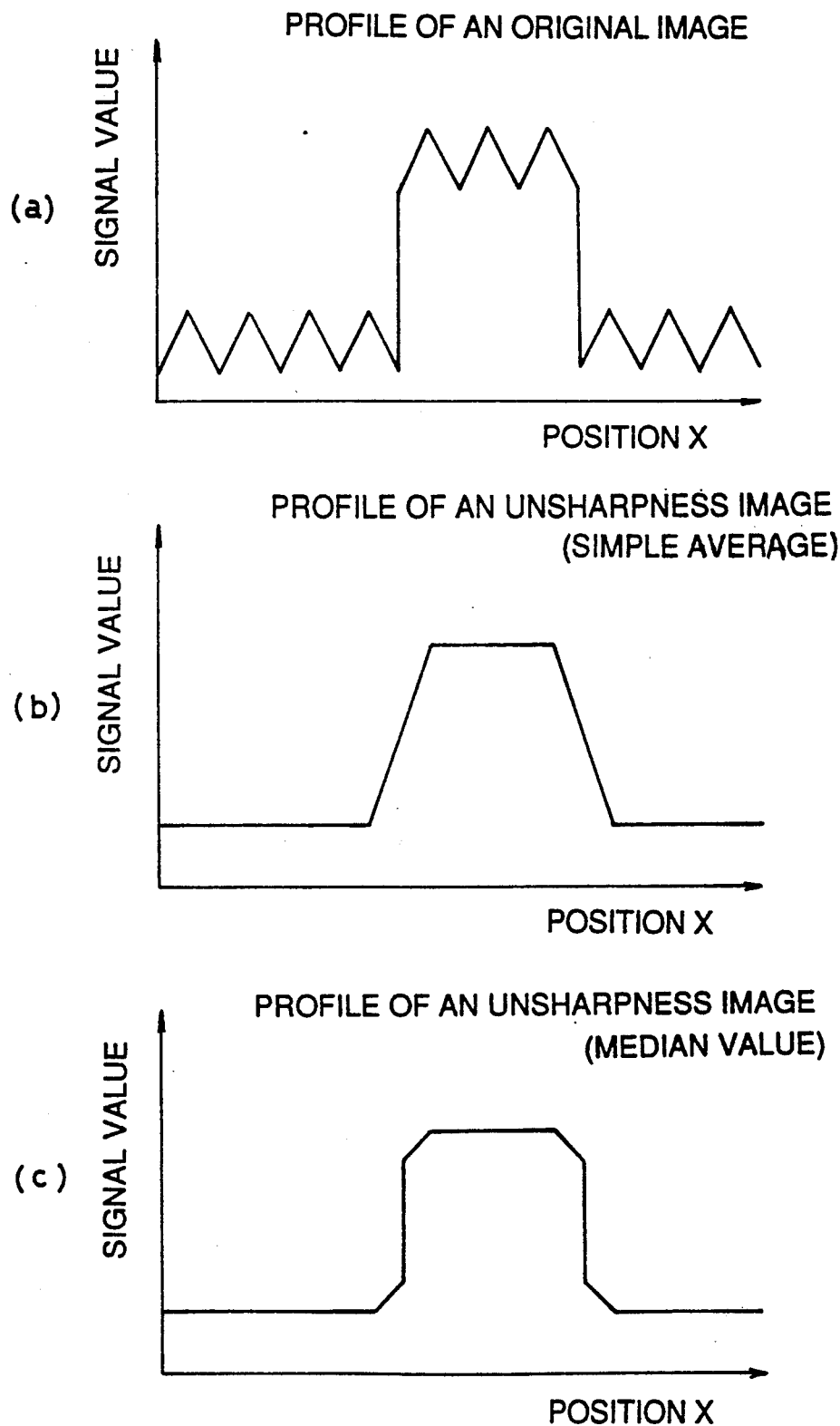
FIG. 20 is a diagram for explaining effects obtained by filtering processing using a median value.

In filtering processing employing a median value, in particular, there is known a characteristic in which edge information that density changes sharply is preserved together with noise elimination, and when such filtering processing employing median values is applied, unsharpness images reflecting more truly the rough change of the original image are obtained, and thus equalization images with excellent quality are obtained, which is preferable. FIG. 20 (a) shows typically a profile in an X direction on an original image and FIGS. 20 (b) and (c) represent respectively image profiles after filtering processing wherein a simple mean and a median value are used respectively in one-dimensional direction. As is clear from the figures, when a median value is used, unsharpness images reflecting more truly the rough change of original images can be obtained, and it is also true in two-dimensional filtering.

This effect of high image quality obtained by using median values is not deteriorated even when reduction and interpolation are conducted, and further, filtering processing employing median values requires a period of time that is several times longer than that in the case of a simple mean. Therefore, the effect of reduced processing time achieved by using reduced images is great.

The shape of the mask does not need to be rectangular and it is allowed to be a circle, a (+)-shaped one, ($\times$)-shaped one, or combination thereof, but when being handled in a computer, a rectangle is preferable and a square is most preferable.

Next, when conducting compression processing of a dynamic range based on an operation expression of $Q' = Q + \beta \cdot (A - Qus)$, a region of interest for the above-mentioned reduced original image is firstly established, and histogram analysis for the region of interest is conducted, and then the above-mentioned constant A is established by the use of a signal average value in the region of interest mentioned above.

Further, the expressions of $\beta = 0$ ($A - Qus < 0$) and $\beta = B$ ($A - Qus \geq 0$, B is a constant) were established and the ratio to the standard signal width of difference between the maximum value and the minimum value in the region of interest was multiplied by 0.6, and was defined as B. In this case, the standard signal width had been set to a certain value in advance.

Since the constant A and the correction coefficient $\beta$ were determined through the foregoing, operation of $\beta \cdot (A - Qus)$ is conducted (S 4, S 5) and the results of the operation are formed on the frame memory as image signals for reduction processing.

In the next stage, the above-mentioned image signals for reduction processing are subjected to linear interpolation and thereby the image for processing having the same number of pixels as in the original radiographic image is formed. Then, addition of such image signals for processing to original radiographic image signals means that operation of $Q + \beta \cdot (A - Qus)$ has been conducted, and thus, image $Q' = Q + \beta \cdot (A - Qus)$ after dynamic range compression processing is formed (S 6). The image obtained after processing is filed in image memory 15 or sent directly to printer 17 (S 7). Further, in the above structure, images stored in the image memory 15 can be read and sent to the printer 17 through which a hard copy can be obtained at any time.

Incidentally, an operation expression may be any of the above-mentioned expressions 1) and 3) or may even be an expression other than the expressions mentioned above, provided that unsharpness mask signals Qus are used.

Figure 13:
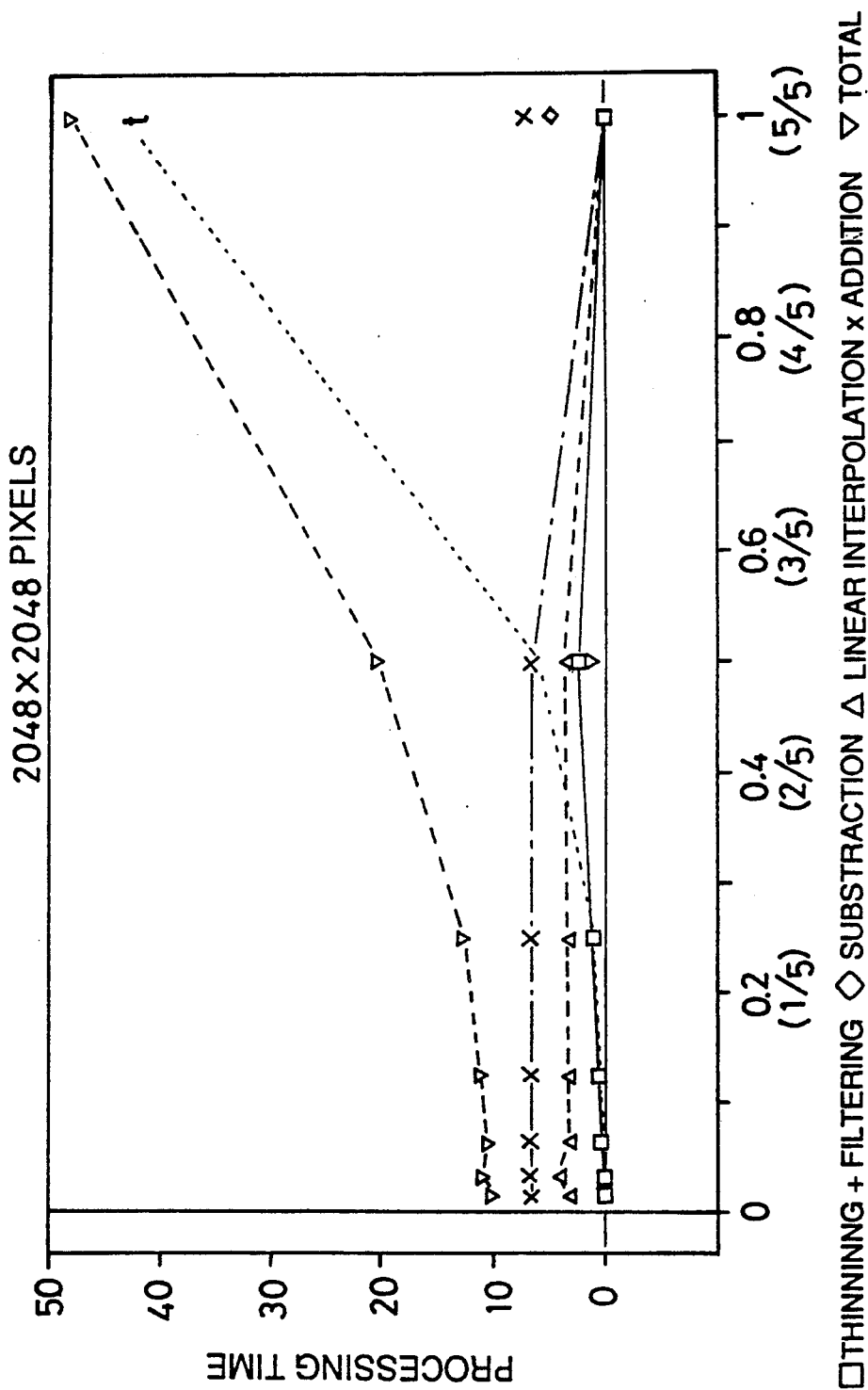
FIG. 13 is a diagram explaining effects obtained by the use of the reduced, unsharpness mask signal.
Figure 14:
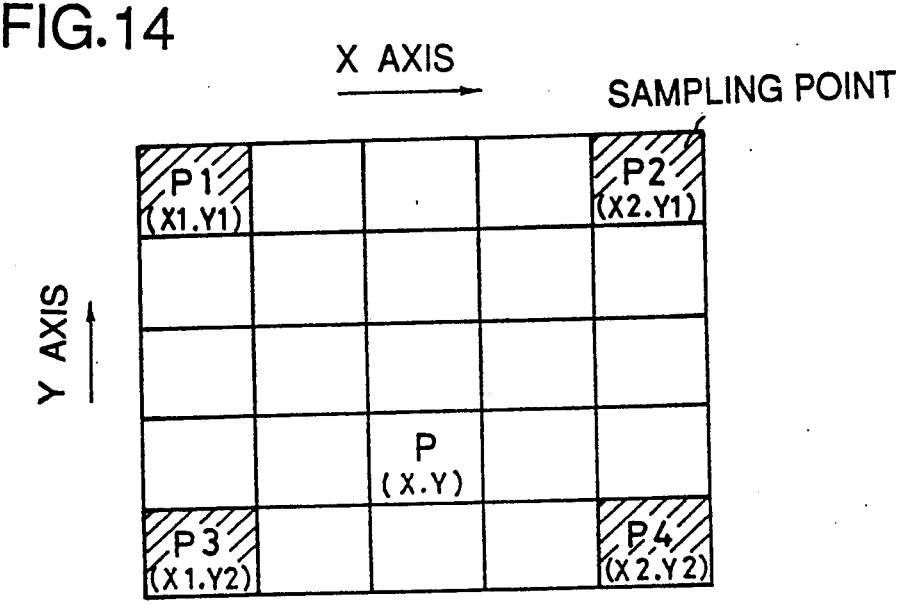
FIG. 14 is a view explaining interpolation calculation characteristics in a linear interpolation calculation.

FIG. 13 represents the relation between the reduction ratio of a reduced original image composed of a plurality of sample points to an original image and processing time. As is apparent from FIG. 13, when a reduced image (a thinned out image) such as the one mentioned above is not used for preparing unsharpness mask signals, the time required for calculating unsharpness mask signals is the most, but when sample point interval P is increased (a reduction ratio 1/P is reduced), the time required for calculating unsharpness mask signals is decreased sharply and thereby a ratio of addition processing time for an original image and an image for processing to the total processing time becomes greater, and when the reduction ratio is in the range from ⅛ to 1/64, a ratio of calculating time for unsharpness mask signals to the total processing time is almost zero. Further, when a hard copy of an image processed at each reduction rate is obtained through a printer 17 and compared visually with the image processed by the use of no reduced image, no difference in terms of image quality between them was observed. The reason for this is that deterioration of image quality caused by reduction and interpolation does not matter because unsharpness mask signals correspond originally to ultra-low spatial frequency of an original image.

In the field of medical images, deterioration of image quality causing a fall of diagnostic ability is more serious compared with images concerning facsimiles and copying machines because the deterioration of image quality has an influence upon human life. In particular, digital radiographic images obtained by reading films by means of an image reading unit or by using a conversion panel as described above are required to be sharper than images of X-ray CT or the like, and therefore, the digital radiographic images have a large number of pixels per one image and are influenced sensitively by deterioration of image quality. When such images are subjected to image processing including reduction and interpolation, a fall of diagnosing capability is feared. Therefore, image processing including reduction and interpolation has not generally been conducted. In the frequency-emphasizing processing using unsharpness mask processing, for example, the frequency characteristic of the image processed has been changed subtly in the case of reduction and interpolation conducted, thereby, no effect of frequency emphasizing intended has been obtained and a fall of diagnosing capability caused by the occurrence of false images has been feared.

In dynamic range compression by means of unsharpness mask processing, however, there is no deterioration of image quality and sufficient effect of dynamic range compression can be obtained even when reduction and interpolation are conducted for compensating a rough change of an image, and further, a remarkable effect of reduction in processing time can be obtained by conducting reduction and interpolation for an image having a large number of pixels.

Now, the effect of reduction in calculation time for unsharpness mask signals in the above-mentioned example will be explained in a more concrete manner as follows.

For example, let it be supposed that an original radiographic image consists of M×N pixels and unsharpness mask signals are calculated by the use of a rectangular shape mask of a×b pixels on the original image In the case of M=N=32 and a=b=12 (see an original image in FIG. 12), if unsharpness mask signals are to be calculated for all of M×N pixels by the use of signals of all pixels included in a×b masks, a×b times additions per one pixel of the original image need to be conducted for all of M×N pixels when obtaining unsharpness mask signals by means of a simple mean of signals in the mask (filtering processing). The operation time required for the above processing is proportional to the following expression.

$$T1 = (a \times b) \cdot (M \times N) = 12 \times 12 \times 32 = 147456$$

In this case, it is possible to bring the time down to the following level by thinking out the calculation method, $$T2 = (2a)(M \times N) = 2 \times 12 \times 32 \times 32 = 24576$$

but this is still long.

In calculation of unsharpness mask signals in the present example shown above, on the other hand, sample points (a pixel given a mark "*" in FIG. 12) are selected on the original image, and unsharpness mask signals are calculated by the use of signal values of only sample points in the mask for only each sample point, and when the obtained reduced unsharpness mask image is added actually to the original image as an image for processing, the number of pixels is returned to the same number by means of interpolation. Therefore, it is possible to reduce the calculation time in the following method.

When the reduction rates (rates of thinning out) in the directions of X axis and Y axis are defined to be 1/P and 1/Q (sample point intervals are P and Q) respectively, additions of (a/P×b/Q) times are to be conducted for (M/P×N/Q) pixels, and operation time therefor is proportional to the following in the case of P=4 and Q=4.

$$T1' = (a/P \times b/Q) \cdot (M/P \times N/Q)$$
$$= (12/4) \times (12/4) \times (32/4) \times (32/4) = 576$$

If the calculation method is thought out, the calculation time may be proportional to the following.

$$T2' = (2 \times a/P) \cdot (M/P \times N/Q)$$
$$= 2 \times (12/4) \times (32/4 \times (32/4) = 384$$

When comparing the calculation time between the case wherein a reduced image is not used and the case wherein a reduced image is used, the comparison between T1s in the same calculation method, and the comparison between T2s in the same calculation method represent 1/256 and 1/64 respectively each of which is a remarkable reduction of calculation time. In the example shown in FIG. 12, the reduction rate is 1/4, but when processing actually the images used for medical applications, the level of M=2048, N=2048, a=128 and b=128, for example, is employed In this case, even when the above-mentioned P and Q take a higher figure such as 64 or so, satisfactory image quality can be obtained, and when P and Q take the figure of 16 respectively, the comparison between T1s gives 1/65536 and the comparison between T2s gives 1/4096, which offers a remarkable effect on reduction of processing time despite the time required for the interpolation operation, because the time for preparing unsharpness mask signals is long originally compared with interpolation operation and high-dimensional interpolation operation is not needed.

The mask dimensions have a great influence on image quality and processing time, and when the dimensions are too small, they decrease the contrast of small structures, while when they are too large, they increase the processing time. With regard to mask dimensions, when the mask is rectangular on the actual image, the length of one side thereof is preferably within the range from 7 mm to 100 mm and more preferably within the range from 15 mm to 50 mm, while when the mask is round, the diameter thereof is preferably within the range from 7 mm to 100 mm and more preferably within the range from 15 mm to 50 mm. With regard to a mask size in the case of a pixel size of 175 μm, it is preferable that length in terms of the number of pixels of one side or of a diameter thereof is within a range from 80 pixels to 256 pixels.

Further, with regard to the reduction ratio for a reduced image, it is preferable that both longitudinal and lateral reduction ratios are the same, but this is not always absolutely necessary. However, it is preferable that the reduction ratio for a reduced image is within a range from $(1/N)^1$ to $(1/N)^{3/8}$ and it is especially preferable that it is within a range from $(1/N)^{3/16}$ to $(1/N)^{5/16}$ for total number of pixels N (in FIG. 7, $N = 12 \times 12 = 144$) included in a filtering mask necessary for an original image.

With regard to a sample point used for interpolation, it is preferable that four points surrounding the point on the original image are used. As a method for interpolation, it is possible to use various methods for interpolation such as a bell-spline interpolation method and a cubic spline interpolation method in addition to a linear interpolation method, but linear interpolation, in particular, is preferable from the point of balance between image quality and processing speed.

Interpolation in a linear correction may be calculated by the use of following expressions, when coordinates of four lattice points (sample points) on an original image are represented respectively by (x1, y1), (x2, y2), (x3, y3) and (x4, y4), signal values of each lattice point are s1, s2, s3 and s4, a coordinate to be obtained by interpolation is (x,y) and a signal value to be obtained is defined to be s.

$$s = (1-k1)\cdot((1-k2)\cdot s1 + k1\cdot(1-k2)\cdot s2 + (1-k1)\cdot k2\cdot k3 + k1\cdot k2\cdot k4$$

where,
$k1 = (x - x1)/(x2 - x1)$,
$k2 = (y - y1)/(y2 - y1)$

Incidentally, in the example mentioned above, an interpolation operation is conducted after an operation of $\beta\cdot(A - Qus)$ on the reduced image. However, it is possible either to conduct operation of $\beta\cdot(A - Aus)$ after obtaining unsharpness mask signals Qus on the reduced image and interpolating them for adjustment to the number of pixels of the original image, or to conduct interpolation after operation of A−Aus and to cause image signals for processing which have been interpolated to be multiplied by correction coefficient $\beta$. Namely, interpolation may be conducted at any step between S3 and S4, between S4 and S5 and between S5 and S6 in the flowchart in FIG. 11.

As timing for interpolation, however, it is preferable from the viewpoint of reducing processing time that operations which can be conducted on the reduced image are conducted on the reduced image as far as possible, and the interpolation operation is then conducted immediately before the calculation of images after the final dynamic range compression processing or concurrently with that.

Further, it is possible to conduct operation of original radiographic image signals concurrently with interpolation operation. In this case, images after interpolation do not need to be stored and therefore less memory capacity is required.

Under circumstances that data transmission is generally time-consuming, when the processing in the second half (in particular, addition and subtraction between an original image and an image for processing) is conducted concurrently with data transmission in the case of transmitting data to other apparatuses such as a printer and an image recording apparatus with a large capacity, it is possible to conduct dynamic range compression processing hardly affecting the cycle time because it is not necessary to consume time only for image processing.

In addition to the above, the aforementioned example has a constitution wherein a reduced original image composed only of sample points on an original image is formed on a frame memory separately from the original image prior to preparation of reduced unsharpness mask signals, and the reduced original image is subjected to filtering processing with a mask size corresponding to the number of sample points included in a mask on the original image for preparation of reduced unsharpness mask signals. In the step of preparing the above-mentioned reduced unsharpness mask signals, intermediate processing (preparation of unsharpness signals, subtraction from constant A and others) for dynamic range compression can be conducted without using an original image, therefore, it is possible to conduct other image processing wherein an original image is used concurrently.

Figure 15:
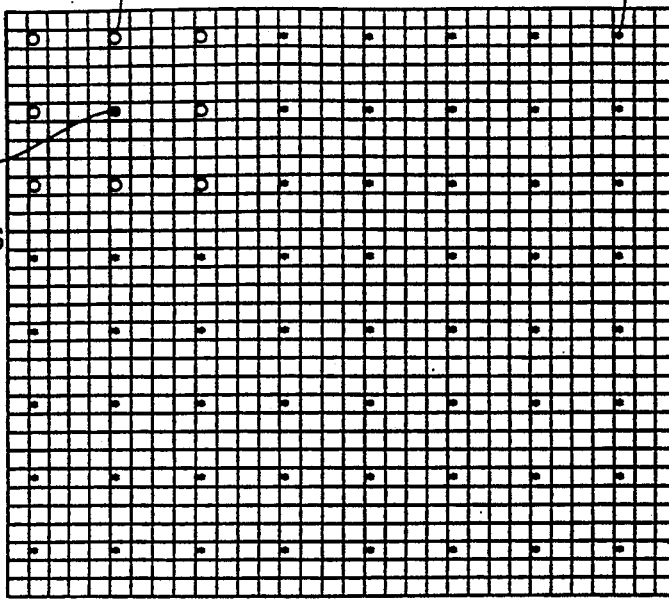
FIG. 15 is a view explaining a state in which the unsharpness mask signal is made on the original image.

However, when no image processing is required to be conducted concurrently as the above case, reduced unsharpness signals may be prepared by taking out the signal values of pixels corresponding to sample points from an original image as shown in FIG. 15.

In the above-mentioned example, after the unsharpness mask signals are prepared, only the signals of images after processing by the use of the unsharpness mask signals are stored. However, it is also possible that original radiographic image signals and reduced unsharpness mask signals or a reduced image for processing prepared by the use of the reduced unsharpness mask signals are stored so that both of them may correspond (S8 in FIG. 11), and when the processed image is required, the original image and the reduced unsharpness images or the reduced images for correction are read, and thus the processing in the second half (processing excluding preparation of reduced unsharpness mask signals) such as interpolation or addition to and subtraction from an original image are conducted based on images read out.

In this case, the original image can be preserved, and compared with an occasion wherein both an original image and a processed image are stored, memory capacity can be saved and the amount of calculation for obtaining an image after processing is small enough because preparation of unsharpness mask signals which is most time-consuming has already been finished, and waiting time for the occasion such as reproducing a processed image on the monitor or making a hard copy is not long. In particular, when making a hard copy or when outputting to a magnetic memory system, image transmission is time-consuming even under the ordinary condition. Therefore, if the aforementioned processing in the second half can be conducted during the period of the transmission mentioned above, the image after processing can be transmitted as if no processing has been conducted. In some cases, both the processed image and original image are needed or only the original image is needed, it is preferable to provide a selecting means for the necessary image for eliminating unnecessary processing.

When transmission and processing (interpolation and correction) are conducted concurrently, the practicable constitution is one wherein data corresponding to two lines are read from the reduced image, then interpolation in Y direction is conducted and data therefrom are stored in a buffer memory, and in the next step, transmission to an external device such as image memory 15 is conducted in succession while adding to the signal value of the corresponding point on the original image during interpolation in X direction.

When reduced unsharpness mask signals or reduced image signals for processing and an original image are stored so that they may correspond each other as stated above, the practicable method is one wherein when at least one of the two items is designated, the other item can be retrieved automatically. For example, when both items are stored based on the same file name, both items can easily be read. A retrieval key may either be a file name or be information stored in a film. It is preferable that an image identification code is used as a file name.

It is also possible to give different names to both items, and the practicable method in this case is one wherein a file that stores the correspondence of both file names is prepared separately, at least one file stores therein the name of the other file, or a common retrieval key (image identification code, for example) is possessed by both items in common.

Further, the practicable constitution is one wherein when at least one of two items is designated, the other item is retrieved automatically through a method conducted generally by the use of a computer or the like, or storage media to be stored are different. However, it is most preferable that both items are stored in the same storage medium under the same file name.

Figure 16:
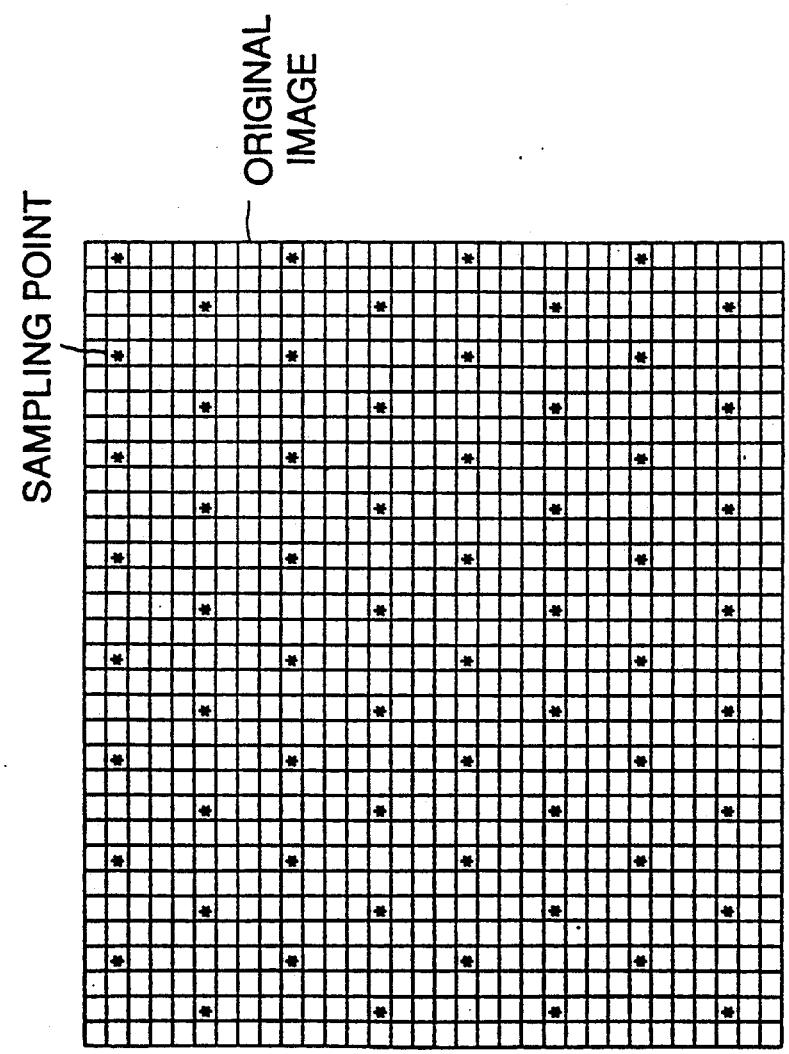
FIG. 16 is a view showing another example of sampling point setting.
Figure 17:
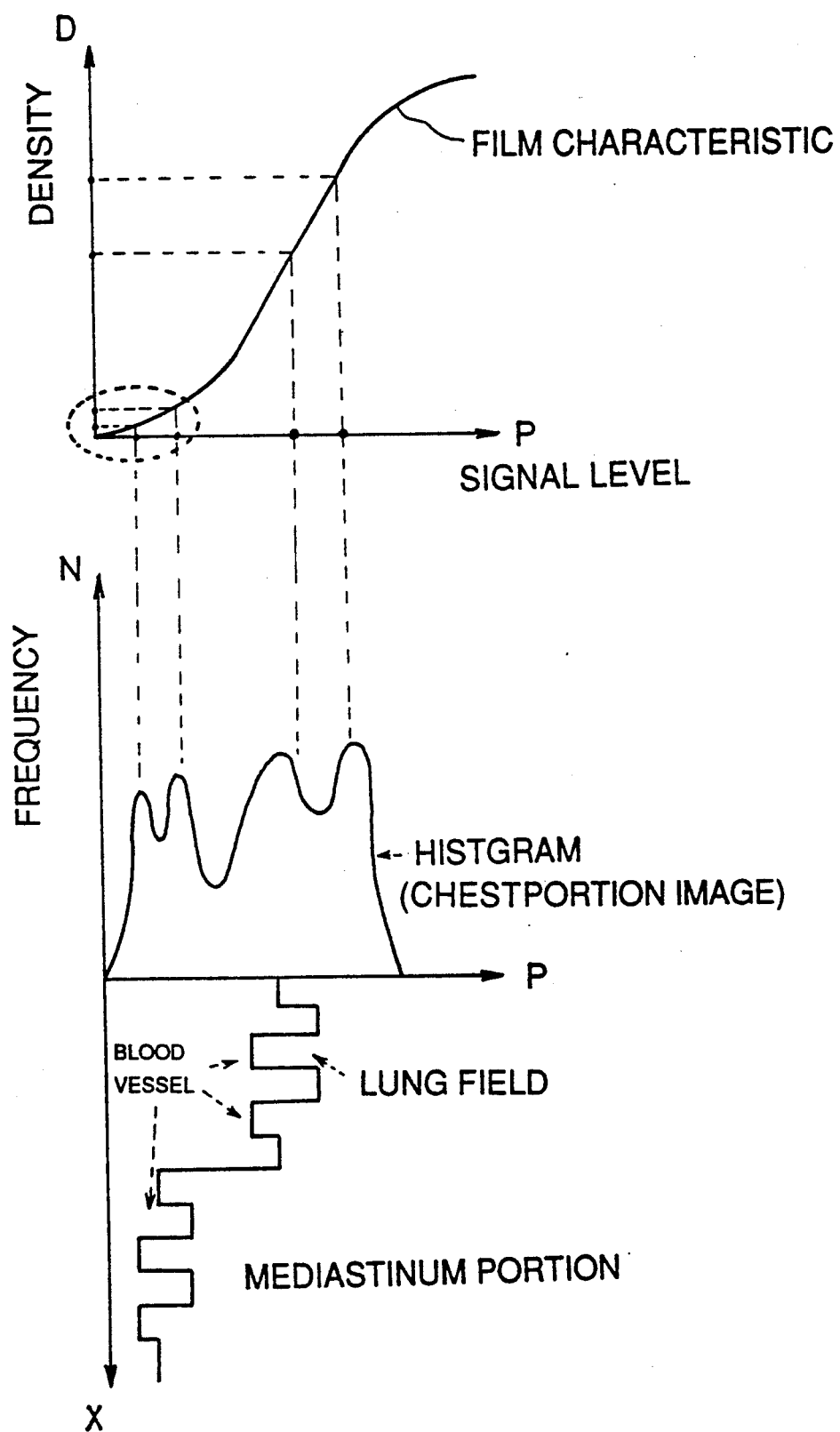
FIG. 17 is a diagram showing a dynamic range in a chest portion radiographic image, and accompanying problems therewith.
Figure 18:
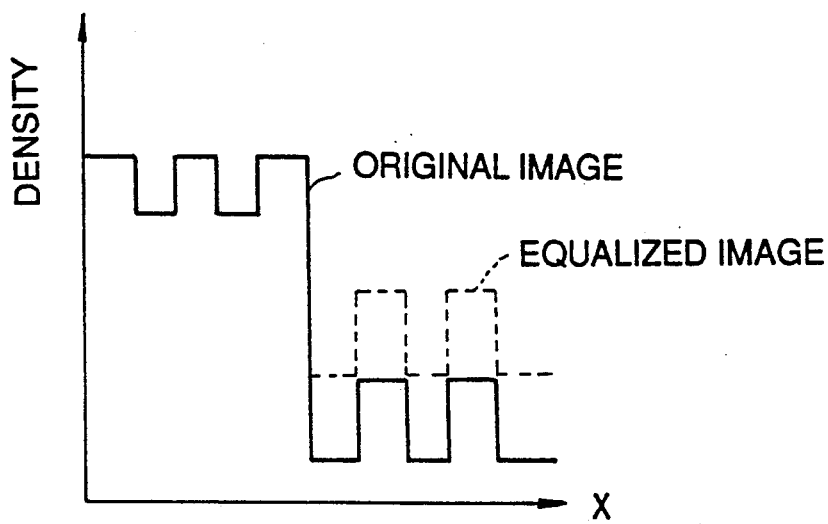
FIG. 18 is a diagram showing effects obtained by compression processing of the dynamic range.
Figure 19:
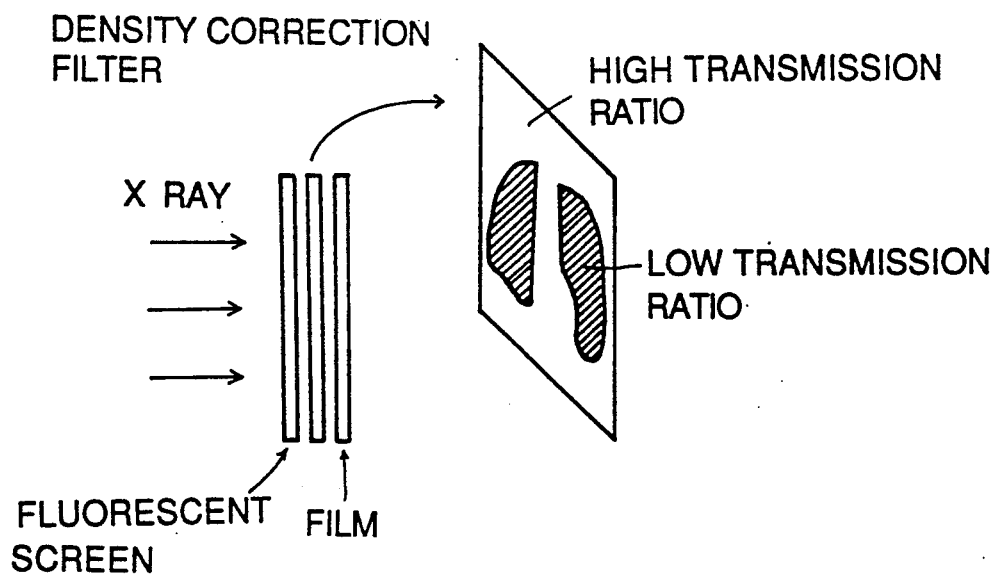
FIG. 19 is a drawing showing a structure for dynamic range compression processing using a density compensation filter.

In the example mentioned above, when selecting a plurality of sample points on the original image, sample points are set in the form of a lattice. Selection for the form of a lattice is not always necessary but it may be in a zigzag form as shown in FIG. 16. However, selection for the form of a lattice is easy to handle and preferable.

A large-sized hospital equipped with a plurality of structures shown in FIG. 7 may also employ the constitution wherein a host computer may be installed and processed images obtained from each radiographing apparatus or pair data of both an original image and reduced image for processing may be transmitted to the host computer, and image data are stored in a data base installed on the host computer.

In the present invention, as stated above, when an original radiographic image is subjected to unsharpness mask processing based on unsharpness mask signals prepared from the original radiographic image signals, reduced unsharpness mask signals are prepared and original image processing is conducted after image size is equalized by means of interpolation. Therefore, processing time required for preparation of unsharpness mask signals which occupies a large portion in the total processing time can be shortened considerably, thus the total processing time can also be shortened sharply, which is an advantage.

When there is employed a constitution wherein reduced original image is prepared separately from an original image when preparing reduced unsharpness mask signals, separate processing using an original image can be conducted concurrently.

Furthermore, if there is employed a constitution wherein both original image signals and reduced unsharpness mask signals or a reduced image for processing based on the reduced unsharpness mask signals are stored, the original image can be preserved while saving memory capacity and processing can be conducted in a short period of time when a processed image is required, which is a further advantageous point.

In addition to the above, when filtering processing using a median value is conducted, the median filter can store edge information in which density is sharply changed, which is a special feature. Therefore, it is possible to obtain unsharpness mask signals reflecting faithfully a rough change of an original image, thereby it is possible to obtain an equalization image with excellent image quality, which is also advantageous.

What is claimed is:

1. An apparatus for processing radiographic image signals, comprising:
    photographing means, including a radioactive ray generating apparatus, for radiographing a subject by directing radioactive rays toward the subject so as to generate image signals representing said subject in a form of pixels, and means responsive to radioactive rays passing through the subject for converting said image signals into original digital image signals So, wherein each of said original digital image signals So indicates a signal level corresponding to an amount of radioactive rays transmitted through each portion of said subject, and wherein said original digital image signals So have various spatial frequencies depending on level changes between pixels and a signal level range indicating the difference between a maximum and minimum signal levels; and
    an image processing device including:
        compressing means for compressing said signal level range of said original digital image signals So by decreasing the amplitude of lower frequency components of said original digital image signals So, said compressing means including:
            producing means for producing an unsharp mask signal for each pixel of said subject so that unsharp mask signals Su corresponding in number to said digital image signals have spatial frequencies corresponding to said lower frequency components of said original digital image signals So and a frequency response characteristic in which a modulation transfer function is not higher than 0.5 when the spatial frequency is 0.5 cycle/mm; and
            calculation means for multiplying said unsharp mask signals Su by a decreasing coefficient K, wherein $0.1 \leq K \leq 0.8$, and for subtracting said multiplied unsharp mask signals from said original digital image signals so as to obtain digital image signals S' such that the amplitude of lower frequency components of said obtained digital image signals S' is smaller than that of said original digital image signals So and said signal level range of said digital image signals S' is narrower than that of said original digital image signals So.

2. The apparatus of claim 1, wherein said producing means determines a mask enclosing a part of a radiographic image represented by said original digital image signals So, and comprises an unsharp mask signal calculation member to calculate said unsharp mask signal by applying a filtering treatment for said original digital image signals So within an area of said mask.

3. The apparatus of claim 2, wherein said compressing means obtains unsharp mask signals Su corresponding to a predetermined low spatial frequency from said original digital image signals So, and includes means for processing said original digital image signals So and said unsharp mask signal Su with a decreasing coefficient K to obtain image signals S' such that the amplitude of said lower frequency components of said obtained digital image signals S'is decreased to be lower than said predetermined low spatial frequency, in accordance with the following equation:

$$S'=So-K\times Su.$$

4. The apparatus of claim 3, wherein said unsharp mask signal has a frequency response characteristic in which the modulation transfer function is not higher than 0.5 when the spatial frequency is 0.5 cycle/mm and the modulation transfer function is not lower than 0.5 when the spatial frequency is 0.01 cycle/mm.

5. The apparatus of claim 3, wherein said decreasing coefficient (K) is $0.2 \leq K \leq 0.7$.

6. The apparatus of claim 3, wherein said decreasing coefficient (K) is $0.20 \leq K \leq 0.32$.

7. The apparatus of claim 2, wherein said compressing means obtains unsharp mask signals Su corresponding to a predetermined low spatial frequency from said original digital image signals So, and includes means for processing said original digital image signals So and said unsharp mask signals Su with a decreasing coefficient K and a constant A to obtain image signals S' such that the amplitude of said lower frequency components of said obtained digital image signals S'is decreased to be lower than said predetermined low spatial frequency, in accordance with the following equation:

$$S'=So+K\times(A-Su).$$

8. The apparatus of claim 7, wherein said decreasing coefficient (K) is $0.1 \leq K \leq 0.8$.

9. The apparatus of claim 7, wherein said decreasing coefficient (K) is 0 when $(A-Su)<0$.

10. The apparatus of claim 7, wherein said decreasing coefficient (K) is $0.1 \leq K \leq 0.8$ when $(A-Su) \geq 0$, or 0 when $(A-Su)<0$.

11. The apparatus of claim 7, wherein said unsharp mask signal has a frequency response characteristic in which the modulation transfer function is not higher than 0.5 when the spatial frequency is 0.5 cycle/mm and the modulation transfer function is not lower than 0.5 when the spatial frequency is 0.01 cycle/mm.

12. The apparatus of claim 2, wherein said producing means sets a plurality of sampling points on said radiographic image and said calculation member calculates said unsharp mask signal S for only each of said sampling points by using only said original digital image signals of said sampling points enclosed by said mask, and wherein said producing means further comprises an interpolation member to interpolate between said unsharp mask signals on said sampling points to produce the same number of unsharp mask signals as that of said original digital image signals so that said producing means processes said original digital image signal on the basis of said unsharp mask signals of the same number.

13. The apparatus of claim 12, wherein said compressing means obtains unsharp mask signals Su corresponding to a predetermined low spatial frequency from said original digital image signals So, and includes means for processing said original digital image signals So and said unsharp mask signals Su with a decreasing coefficient K to obtain image signals S' such that the amplitude of said lower frequency components of said obtained digital image signals S'is decreased to be lower than said predetermined low spatial frequency, in accordance with the following equation:

$$S'=So-K\times Su.$$

14. The apparatus of claim 12, wherein said compressing means obtains unsharp mask signals Su corresponding to a predetermined low spatial frequency from said original digital image signals So, and includes means for processing said original digital image signals So and said unsharp mask signals Su with a decreasing coefficient K and a constant A to obtain image signals S' such that the amplitude of said lower frequency components of said obtained digital image signals S'is decreased to be lower than said predetermined low spatial frequency, in accordance with the following equation:

$$S'=So+K\times(A-Su).$$

15. The apparatus of claim 14, wherein said decreasing coefficient (K) is 0 when $(A-Su)<0$.

16. The apparatus of claim 12, wherein said calculation member comprises a sampling point image-forming member to form a sampling point image composed of said original digital image signals on said sampling points and calculates said unsharp mask signals from said sampling point image.

17. The apparatus of claim 12, further comprising memory means for storing said original digital signals and said unsharp mask signals.

18. The apparatus of claim 2, wherein said producing means sets a plurality of sampling points on said radiographic image and said calculation member calculates said unsharp mask signal for only each of said sampling points by using only said original digital image signals of said sampling points enclosed by said mask, and wherein said producing means further comprises an interpolation member to interpolate between image signals obtained by said unsharp mask signals on said sampling points to produce the same number of image signals as that of said original digital image signals so that said producing means processes said original digital image signals on the basis of said image signals of the same number.

19. The apparatus of claim 18, wherein said compressing means obtains unsharp mask signals Su corresponding to a predetermined low spatial frequency form said original digital image signals So, and includes means for processing said original digital image signals So and said unsharp mask signals Su with a decreasing coefficient K to obtain image signals S' such that the amplitude of said lower frequency components of said obtained digital image signals S'is decreased to be lower than said predetermined low spatial frequency, in accordance with the following equation:

$$S'=So-K\times Su.$$

20. The apparatus of claim 18, wherein said compressing means obtains unsharp mask signals Su corresponding to a predetermined low spatial frequency from said original digital image signals So, and includes means for processing said original digital image signals So and said unsharp mask signals Su with a decreasing coefficient K and a constant A to obtain image signals S' such that the amplitude of said lower frequency components of said obtained digital image signals S'is decreased to be lower than said predetermined low spatial frequency, in accordance with the following equation:

$$S = So + K \times (A - Su).$$

21. The apparatus of claim 20, wherein said decreasing coefficient (K) is 0 when (A−Su)<0.

22. The apparatus of claim 18, wherein said calculation member comprises a sampling point image-forming member to form a sampling point image composed of said original digital image signals on said sampling points and calculates said unsharp mask signals from said sampling point image.

23. The apparatus of claim 18, further comprising memory means for storing said original digital signals and said unsharp mask signals.

24. The apparatus of claim 2, wherein said calculation member applies said filtering treatment by using a median value.

* * * * *